(12) United States Patent
Parry et al.

(10) Patent No.: US 7,542,160 B2
(45) Date of Patent: *Jun. 2, 2009

(54) RENDERING WITH SUBSTITUTED VALIDATION INPUT

(75) Inventors: Travis J. Parry, Boise, ID (US); Robert Sesek, Meridian, ID (US); Chad A. Stevens, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1139 days.

This patent is subject to a terminal disclaimer.

(21) Appl. No.: 10/652,061

(22) Filed: Aug. 29, 2003

(65) Prior Publication Data

US 2005/0231746 A1    Oct. 20, 2005

(51) Int. Cl.
*G06F 15/00* (2006.01)
(52) U.S. Cl. ............... 358/1.15; 382/119; 715/222; 715/225; 715/268
(58) Field of Classification Search ........... 358/1.13, 358/1.18, 501, 537, 452, 450; 382/306, 319, 382/119, 181, 186, 187; 713/176; 715/221–225, 715/268; 396/313
See application file for complete search history.

(56) References Cited

U.S. PATENT DOCUMENTS

| 3,890,599 | A | * | 6/1975 | Simjian ............... 340/5.86 |
| 4,760,606 | A | * | 7/1988 | Lesnick et al. ............ 382/306 |
| 4,918,723 | A | * | 4/1990 | Iggulden et al. ........ 379/100.17 |
| 5,060,980 | A | * | 10/1991 | Johnson et al. ............ 283/70 |
| 5,101,447 | A | * | 3/1992 | Sokoloff et al. ............ 382/283 |
| 5,134,669 | A | * | 7/1992 | Keogh et al. ............ 382/318 |
| 5,480,246 | A | * | 1/1996 | Morimoto ............ 400/615.2 |
| 5,530,907 | A | * | 6/1996 | Pavey et al. ............ 710/69 |
| 5,579,487 | A | * | 11/1996 | Meyerson et al. .......... 710/100 |
| 5,754,308 | A | * | 5/1998 | Lopresti et al. ............ 358/403 |
| 5,835,577 | A | * | 11/1998 | Di Santo et al. ......... 379/93.19 |
| 5,991,469 | A | * | 11/1999 | Johnson et al. ............ 382/317 |
| 6,148,066 | A | * | 11/2000 | Di Santo et al. |
| 6,198,809 | B1 | * | 3/2001 | Disanto et al. .......... 379/93.23 |
| 6,411,784 | B1 | * | 6/2002 | Taniguchi .............. 399/6 |
| 6,505,179 | B1 | * | 1/2003 | Kara ............ 705/50 |
| 6,522,770 | B1 | * | 2/2003 | Seder et al. ............. 382/100 |
| 6,564,249 | B2 | * | 5/2003 | Shiigi ............ 709/206 |
| 6,570,997 | B2 | * | 5/2003 | Noguchi ............ 382/100 |
| 6,704,906 | B1 | * | 3/2004 | Yankovich et al. ........ 715/222 |
| 6,816,630 | B1 | * | 11/2004 | Werth et al. ............. 382/287 |
| 6,826,551 | B1 | * | 11/2004 | Clary et al. ............. 706/46 |
| 6,950,553 | B1 | * | 9/2005 | Deere ............ 382/218 |
| 6,959,298 | B1 | * | 10/2005 | Silverbrook et al. .......... 707/10 |
| 6,980,312 | B1 | * | 12/2005 | Czyszczewski et al. .... 358/1.15 |
| 7,010,147 | B2 | * | 3/2006 | Silverbrook et al. ........ 382/119 |
| 7,106,888 | B1 | * | 9/2006 | Silverbrook et al. ........ 382/119 |

(Continued)

OTHER PUBLICATIONS

User interface for a PCS smart phone Narayanaswamy, S.; Jianying Hu; Kashi, R.; Multimedia Computing and Systems, 1999. IEEE International Conference on vol. 1, Jun. 7-11, 1999 pp. 777-781 vol. 1 Publication Date Jul. 1999.*

*Primary Examiner*—Kimberly A Williams

(57) ABSTRACT

Predetermined indicia are detected in a digital image that is formed by optical scanning. Alternatively, or in addition, a digital image can have a predefined insertion field. Input and/or an optically scanned image is substituted in the digital image for the predetermined indicia and/or for the predefined insertion field. The digital image having the substitution is rendered.

43 Claims, 8 Drawing Sheets

U.S. PATENT DOCUMENTS

| | | | |
|---|---|---|---|
| 7,120,798 B2 * | 10/2006 | Suisa | 713/176 |
| 7,133,557 B2 * | 11/2006 | Silverbrook et al. | 382/188 |
| 7,139,431 B2 * | 11/2006 | Silverbrook et al. | 382/188 |
| 7,200,811 B1 * | 4/2007 | Takashima | 715/210 |
| 7,221,781 B2 * | 5/2007 | Silverbrook et al. | 382/119 |
| 7,259,895 B2 * | 8/2007 | Tecu et al. | 358/474 |
| 7,263,225 B2 * | 8/2007 | Silverbrook et al. | 382/188 |
| 7,289,685 B1 * | 10/2007 | Wolff et al. | 382/317 |
| 7,457,464 B2 * | 11/2008 | Stevens et al. | 382/181 |
| 2003/0221130 A1 * | 11/2003 | Henry | 713/202 |
| 2004/0032624 A1 * | 2/2004 | Stevens et al. | 358/402 |
| 2004/0070614 A1 * | 4/2004 | Hoberock | 345/764 |
| 2004/0100669 A1 * | 5/2004 | Tecu et al. | 358/497 |
| 2005/0047682 A1 * | 3/2005 | Stevens et al. | 382/306 |
| 2005/0057779 A1 * | 3/2005 | Sesek et al. | 358/400 |
| 2006/0007189 A1 * | 1/2006 | Gaines et al. | 345/179 |
| 2007/0188793 A1 * | 8/2007 | Wakai | 358/1.14 |

* cited by examiner

RENDERING WITH SUBSTITUTED VALIDATION INPUT

FIELD OF THE INVENTION

The present invention relates generally to peripheral devices, and more particularly to a digital transmitter device for digitally collecting input used to validate and to substitute in a rendering.

BACKGROUND OF THE INVENTION

Many peripherals to computer networks include a scanner component. One example of such a peripheral is an "All-in-one", also known as a multifunction peripheral (MFP) in that it has the capability to perform the multiple functions of scanning hardcopy documents, copying, and printing. Another example is a digital network copier that scans in documents from an automatic document feeder, does high volume copying, and has the capabilities of binding, collating, folding, stacking, stapling, stitching, edge-trimming, paginating, and printing on substrates of varied composition. Each of these peripherals, when in communication with an interconnecting network, can also be described as being a digital transmitter device. A digital transmitter device typically has an input device (e.g. a keyboard), a display, a scanner, and an output device. The output device of the digital transmitter device can be for sending a facsimile or an electronic mail message (e-mail). A digital transmitter device need not have a printer.

In an exemplary scanning operation, a hardcopy of a document or other physical object can be presented to the scanner portion of a digital transmitter device. After scanning, the digital transmitter device transforms the scanned image into a digital representation. If the digital transmitter device has a printer, the digital representation can be rendered to the printer to produce one or more hardcopies. If the digital transmitter device has facsimile transmission capabilities and a network over which to transmit a facsimile, the digital transmitter device can render the digital representation of the scanned image into a facsimile image that can be transmitted over the network to a predetermined or input facsimile telephone number.

In an exemplary digital transmitting operation, a hardcopy of a document or other physical object can be presented to the scanner portion of a digital transmitter device. After scanning, the digital transmitter device transforms the scanned image into a digital representation that is then saved in a data format, such as in a bit map data format or in a Portable Document Format (PDF). Electronic messaging can be used to send an electronic mail (e-mail) message from the digital transmitter device with an attachment of the digitized representation in the data format. The e-mail message can be sent to recipients over an interconnecting network, where the recipients have an e-mail address that a user manually enters at the digital transmitter device or that a user specifies using a predefined list of recipient e-mail addresses that can be stored in a memory of the digital transmitter device.

A hardcopy of a document that is to be scanned may need to be modified so that the resultant scanned document will contain the modifications. For instance, a user may wish to add a text message or a symbol to the hardcopy of the document. To do so, a softcopy of the document is edited using a document processing application. Then, a hardcopy of the edited document is output for scanning. In the interest of security, any such modification of the document may be required to be validated by an access control methodology prior to such modification and/or the outputting of the edited document prior to a transmission thereof.

There is a need for a scanner-based device, such as a digital transmitter device, that provides the security of user access control for modifications of a document at the scanner-based device without requiring the user to edit a softcopy of the document on another computing device.

SUMMARY OF THE INVENTION

In one implementation, a digital transmitter device composes a digital image from an optically scanned image, detects an input requirement, receives the required input, performs access control using the received input, substitutes the received input or representation thereof in the digital image, and renders the digital image.

In another implementation, a digital transmitter device scans an image for inclusion in a document. The document includes a form template that incorporates the scanned image in a predefined insertion field. The form template, or parameters thereof, are stored in or accessible to the digital transmitter device. An optical scanner of the digital transmitter device scans the image for inclusion in the form template in accordance with a size or position of a predefined insertion field. A validation of the scanned image, or representation thereof, is performed against an access control data. Upon the validation, the scanning device incorporates the scanned image into the predefined insertion field of the form template.

DESCRIPTION OF THE DRAWINGS

A more complete understanding of the various implementations of the present invention may be had by reference to the following detailed description when taken in conjunction with the accompanying drawings wherein the same reference numbers are used throughout the drawings to reference like components and features, and wherein:

FIG. 1b is an example of a user interface, according to an embodiment of the present invention, for a digital transmitter device in FIG. 1a.

DETAILED DESCRIPTION

Figure 1A:
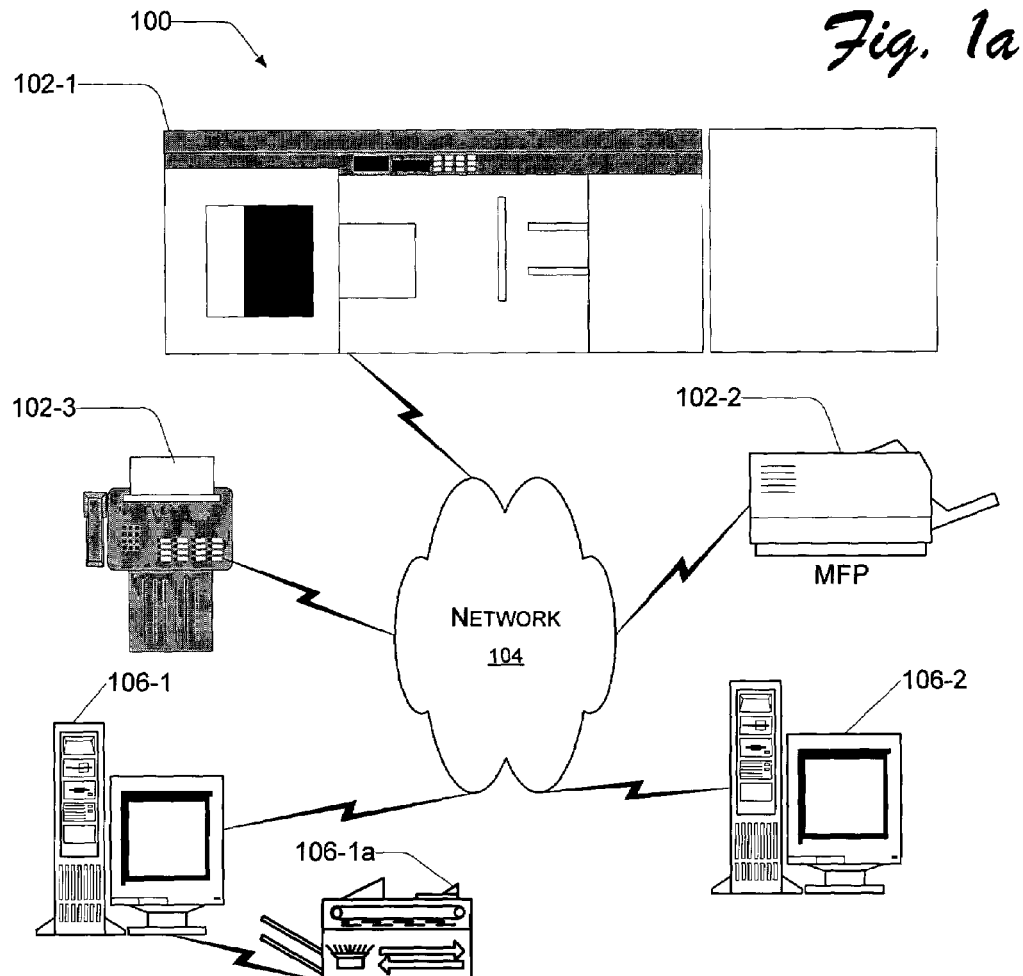
FIG. 1a is a block diagram, according to an embodiment of the present invention, depicting a computing and communication environment having various digital transmitter devices in a system environment suitable for providing local access to the digital transmitter devices.

Implementations described herein provide access control to a digital transmitter device based upon user input, where the user input corresponds to text and/or objects that are inserted into a document at one or more predetermined insertion fields without editing the document with a word processor. In a first implementation, the document is marked up with detectable indicia at one or more predetermined insertion fields where the text and/or objects are to be inserted. The marked up document is scanned to form an optically scanned image, and the detectable indicia is detected in the optically scanned image to ascertain the one or more predetermined insertion fields. The user is prompted to enter the text and/or objects (or representations thereof) that are to be respectively inserted into the one or more predetermined insertion fields. Alternatively, the text and/or objects (or representations thereof) can be optically scanned and then respective inserted into the one or more predetermined insertion fields. In a second implementation, a form code is communicated to the digital transmitter device. The form code is used by the digital transmitter device to identify a form template that has one or more predetermined insertion fields. The user is prompted to enter the text and/or objects (or representations thereof) that are to be respectively inserted into the one or more predetermined insertion fields. Alternatively, the text and/or objects (or representations thereof) can be optically scanned and then respectively inserted into the one or more predetermined insertion fields.

A user enters input that is used as access control to operation of the digital transmitter device. The input, for instance, can be physically entered by the user at an input device such as a keypad and/or at a touch sensitive menu screen. If access is granted based upon the input, text and/or objects are retrieved. The text and/or objects can be directly entered as input to the digital transmitter device by the user. Alternatively, the input provided by the user can be used to perform a lookup in a table or other logical structure to retrieve the text and/or objects.

The retrieved text and objects are inserted at the predetermined locations in the document in the optically scanned image to thereby produce a modified optically scanned image of the document. The modified optically scanned image can be printed, transmitted to one or more facsimile telephone numbers, transmitted to one or more electronic mail (e-mail) addresses, and/or transmitted to one or more storage mediums (i.e., network share drives, RAM memory, etc.).

The first implementation relates to the scanning of a hardcopy to produce an optically scanned image at a digital transmitter device. The hardcopy has certain detectable indicia on its face. This detectable indicia is representative of one or more insertion fields into which text or an object is to be inserted. Scanning the hardcopy produces an optically scanned image. The optically scanned image is examined for the presence of the detectable indicia corresponding to one or more insertion fields. Detectable indicia determined to be present is further examined to determine the position, size, and shape of each of the one or more insertion fields. Upon this determination, respective text and/or objects are fit into each of the one or more insertion fields to produce a modified scanned image. The text and/or objects are located, identified, and/or retrieved using routines that call for interactive user input and/or retrieval of data from a database based upon interactive user input, such as where the user physically inputs data from a keypad and/or touch screen.

The detectable indicia can be quite diverse in type and kind. The type and kind of detectable indicia need only be detectable by a detection routine that is performed upon an optically scanned image. As such, the detectable indicia can be an ink that is visible upon application by a user to a paper document but becomes invisible to the human eye when the ink dries. Nevertheless, the dry ink is still detectable by the detection routine that is performed upon the optically scanned image. Invisible ink may be selected as the desirable detectable indicia in that the original paper document is not obscured by a user's markings. The dry ink, when invisible to the human eye, can be detected when it exhibits a predetermined range of reflectance values or exhibits an inherent reflectivity property (e.g., one or more wavelengths, $\lambda$) that can be found by the detection routine performed upon the optically scanned image. The reflective property of the ink can be understood as a particular hue or color that is found within the optically scanned image by the detection routine. The dry ink, in another example, may only be visible to the human eye when illuminated by a certain color of light, such as a blue-violet light. As such, the dry ink would only be detectable when illuminated by light of one or more predetermined ranges of wavelengths.

Alternatively, the detectable indicia can be a bar code or other patterned indicia that can be detected within the optically scanned image by the detection routine. Other detectable indicia are also contemplated, any of which can be found by known detection routines performed upon an optically scanned image.

As described above, the detectable indicia is representative of one or more insertion fields into which text or an object is to be inserted. The detection routine, once having determined the presence of detectable indicia in the optically scanned image, will use the detected presence to determine various characteristics, respectively, of the one or more insertion fields. These characteristics can include the number, location, size, and shape of the one or more insertions fields. For example, a user can apply sticky bar code labels of different types to a piece of paper that is to be scanned. Alternatively, the user can also edit a softcopy of the document so as to include images of the bar codes or like detectable indicia.

The types of bar codes placed on the hardcopy, or its corresponding softcopy, by the user can have respectively different significance in subsequent processing. A particular bar code that is detected by a detection routine may be interpreted as an instruction to prompt a user to input a code at a user interface of the digital transmitter device. For instance, the prompt may direct the user to physically input data from a keypad and/or touch screen. This input code would then be used to look up text and/or one or more objects that are to be fit as a substitution for the detectable indicia into the corresponding insertion field. The input code may also be used to ascertain a predetermined shape and size of the insertion field. Alternatively, the input code might be used to retrieve a particular e-mail address distribution list from a particular database so that an e-mail message can be addressed to each of the e-mail addresses along with an attached file containing the optically scanned image as modified by the inserted text and objects. A different bar code that is detected by a detection routine may be interpreted as an instruction to prompt a user to make a handwritten mark using a stylus on a touch sensitive menu screen of a user interface with the digital transmitter device. The handwritten mark can be processed in a variety of ways, include the fitting of the same into an insertion field of predetermined size at the location of the bar code in the optically scanned image. The optically scanned image is modified so as to show the handwritten mark, such as by obscuring the document beneath the handwritten mark, or by watermarking the handwritten mark so that it does not obscure the document beneath the handwritten mark—depending upon which bar code the user applied to the hardcopy.

In addition to or as an alternative to bar codes, a user can make marks or symbols on the hardcopy that is to be scanned, such as with one or more types of non-human visible inks such as the invisible ink described above. For instance, each ink can exhibit different inherent reflectivity properties (e.g., a different wavelength—$\lambda$), each having a significance similar to that of the different bar codes.

The different bar codes and markings, as described above, can represent different shapes and sizes of insertion fields. For instance, a user may use ink to mark a periphery of an insertion field, or the user can make a mark on the hardcopy for which the periphery of an insertion field is predetermined. For instance, the mark "x" may be an indicator for an insertion field having a shape that is any of: a circle having a one (1) inch radius, a two (2) inch square, an ellipse having two foci separated by one (1) inch, etc. Two dots made by a user on a paper document may interpreted by a detection routine as indicating, respectively, the upper left and lower right corners of a rectangular insertion field. The type, shape, and size of markings that correspond to insertion fields of various shapes, sizes, and positions are not limited by the examples given herein.

Upon detection of the detectable indicia corresponding to each insertion field and the shape, size, and position thereof, (e.g., invisible ink, bar code, or other significant mark), the detection routine can also determine what is to be inserted into each insertion field. For instance, the detection of ink having a specific reflective property may be recognized as a cue to prompt the user for input. After the user has responded with input to the prompt, the optically scanned image would then be modified to fit the user's input into the size, shape and position of the insertion field so as to create a modified scanned image. The modified scanned image can then be rendered as a hardcopy upon which the user's input is seen. Other output renderings are also contemplated.

The user can mark one or more fields on the paper that is to be optically scanned. The shapes of the marks made by the user, and the types of ink used by the user, can have respectively different significances in subsequent processing by various detection routines. A particular mark that is detected by a detection routine may be interpreted as an instruction to prompt a user to input a code at a user interface of the digital transmitter device, such as by using a keypad and/or touch sensitive menu screen. This input code can then be used to look up text and/or objects that are to be fit into an insertion field of predetermined size at the location of the particular mark. This or another input code might be used for the retrieval of a distribution list of e-mail addresses from a particular database so that respective e-mail messages can be addressed for the transmission thereto of the modified scanned image. A different mark that is detected by a detection routine may be interpreted as an instruction to prompt a user to make a handwritten mark using a stylus on a touch sensitive menu screen of a user interface. The handwritten mark can be processed in a variety of ways, as described herein.

The second implementation produces a document with a digital transmitter device. The document is based on a form template that incorporates a scanned image into a predefined insertion field. The form template, or parameters thereof, is stored in or accessible to the digital transmitter device. In the second implementation, an image is scanned for inclusion in the form template. The scan is automatically performed in accordance with a size or position of the predefined insertion field. The scanned image, or a representation thereof, is validated against an access control database. When the validation for the scanned image is negative, a diagnostic is output that reflects the absence of validation of the scanned image. When the validation for the scanned image is positive, the scanned image is incorporated into the form template at the predefined field and a rendering of the form template is output.

In the first or the second implementation, once text and/or objects have been inserted into corresponding predetermined insertion fields, the resultant modified scanned image can be rendered as a hardcopy to a printer. In an alternative implementation, a user can be prompted at the digital transmitter device to input a code that is used to look up an e-mail address or a facsimile telephone number to which the modified scanned image is to be transmitted. The modified scanned image can then be transmitted by e-mail or by facsimile to a facsimile telephone number, or it can then be rendered as a hardcopy to a printer or any combination of the forgoing.

A network message can be transmitted so as to include the modified scanned image in a transmission of message data via an e-mail message from the digital transmitter device to one or more e-mail address(es). When an e-mail message is sent from a digital transmitter device, message data including the modified scanned image can be attached to the e-mail message.

The e-mail message is sent from the digital transmitter device to an electronic address including an address of a network resource and a destination location thereat. The modified scanned image in the message data can be composed from the digitized image that was captured by the scanning mechanism, which digital image was modified by any insertion fields as described above. The e-mail address (es) can be anyone of an electronic mail (e-mail) address at an e-mail server on a network, a file folder address at a server on a network, a Web site address at a server on a network, and the like.

The digitizing of the composition process for the message data can include handwriting, or other indicia, that was captured from a user's use of an input device, such as a touch sensitive menu screen, a keyboard, etc. One result of the composition or digitizing process is that the input from the input device (e.g., handwriting received at a touch sensitive menu screen) can be superimposed on, around, or near the image that has been composed or digitized. As such, the resultant appearance of the rendered documents sent in the e-mail message will be that the handwriting, or other indicia, appears to be integral to or a part of the original images on the documents that were captured by the scanning mechanism.

Access Control to the Digital Transmitter Device

A user can key in or input a user identification code (ID) prior, after, or simultaneous with the scanning of a document at a digital transmitter device. The user can also use a pen or stylus upon a touch sensitive menu screen to mark a signature or other indicia of identity (e.g., initials of the signer). The digital transmitter device, or other network device, then performs one or more access control or validation processes against one or both of the User ID and the manually input signature. The one or more processes are executed in order to determine whether or not the user has sufficient access rights to use the digital transmitter device. Thus, these processes can determine whether or not the user has access to various functionalities of the digital transmitter device, including sending an email message to an e-mail address specified by the user, optical scanning, copying, faxing, editing, etc. Execution of the one or more access control processes can be performed by use of an inquiry that is made to a location at which the user IDs are stored, such as at a network device (e.g. a server) in communication with the digital transmitter device, or the inquiry can be made at the digital transmitter device itself. Alternatively, an inquiry can use the User ID as the code for accessing a storage location to obtain a digital representation of a handwritten signature for comparison to the manually input signature that was captured by the digital transmitter device on the touch sensitive menu screen. Other identification criteria can also be used to ascertain signature validity, such as the speed at which the signature is executed. The storage location will preferably contain User ID access control information for each User ID on a particular network or for a particular digital transmitter device. Alternatively, the User ID access control information can contain the user ID and a respective representation of a signature for a plurality of digital transmitter devices that are in communication with a common interconnected network.

The result of the access control check can be a negative result or a positive result. The digital transmitter device can review the result. If there is an invalid access control status (e.g., negative result), then the digital transmitter device will display a diagnostic message or error code. The user may then input a different User ID and/or signature or marking to the digital transmitter device. A user can attempt to gain access until the User ID and/or signature are eventually validated or the operation of the digital transmitter device is frozen due to a predetermined number of failures in the attempts to gain access.

Upon validation or acceptance of the User ID and/or signature, the scanning mechanism initiates the scanning process to optically capture the images on the document. The optically captured images, including the manually input signature, are subjected to a document composition routine at the digital transmitter device. The document composition routine can be used to put the optically captured images into a data format that reflects the presence of, and the integration with, a superimposed rendering of the manually entered signature upon the hardcopy of the page that is rendered in the data format. The superimposed signature will be fit by the document composition routine into one of the insertion fields that was identified by the presence of one or more fields at predetermined positions and/or one or more fields of detectable indicia.

As an alternative, the validation process or other access control check can be skipped. In this case, the process would proceed as described above by superimposing the manually entered signature, and/or the User ID, on the rendered page in the data format by the document composition routine. In this case, the recipient of the facsimile or the e-mail message could review the superimposed images of the handwritten signature and/or the User ID, and, if desired, apply a validation process. As a further alternative, when the validation process or other access control check results in a negative validation of the handwritten signature and/or the User ID, the facsimile or the e-mail message can still be sent and the rendered document attached to the e-mail message may include a notation that the result of the access control check was negative.

The location of the access control information and related signature representation for each User ID on a network can be diverse. For example, a digital transmitter device can function independently so that each user's User ID and associated signature representation is maintained by the digital transmitter device. As such, the digital transmitter device would perform the access control check for each manually entered User ID and/or signature. Once performed, the access control check would have ascertained the validity and/or access rights of the user to use the digital transmitter device. Given that the rights of the user are sufficient, the digital transmitter device would be enabled to proceed with the sending of a facsimile to a facsimile telephone number or with the sending of an e-mail message to an e-mail address that was specified by the user. As stated above, the rights of a user to use the digital transmitter device can be ascertained either by a query that is made to another network device that is in communication with the digital transmitter device through an interconnected network, such as a server, or by a query that is made directly to the digital transmitter device itself.

Exemplary System for Configuration of a Digital Transmitter Device

FIG. 1a illustrates an example of a system environment 100 suitable for implementing an embodiment of the present invention. The system environment 100 contemplates a plurality of digital transmitter devices 102-i (e.g., 102-1, 102-2, etc.) that can be in communication with an interconnected network 104. Interconnected network 104 is in communication with one or more server(s) 106-i. Each server 106-i can be an e-mail message server that serves one or more e-mail addresses to which any digital transmitter device 102 can send an e-mail message. Digital transmitter devices 102-i may be stand-alone devices that have a scanning mechanism, and may also have an output mechanism such as a printer, a copier or a fax machine. As such, each digital transmitter devices 102-i can be a multifunction peripheral (MFP) device that combines the scanning mechanism and the output mechanism into a single device. A digital transmitter device 102-i can function while uncoupled or isolated from other devices. A digital transmitter device 102-i therefore can be a device such as a copier, a scanner, or a fax machine such as are shown in FIG. 1a.

Figure 1B:
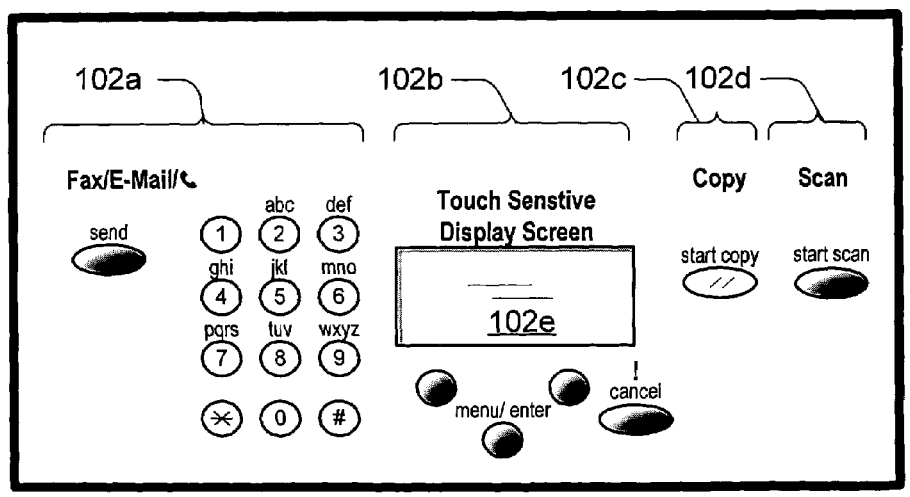

Digital transmitter devices 102-i are generally distinguishable from devices such as desktop PCs (personal computers), laptop PCs, and pocket PCs by their limited purpose and limited user interface or input/output capabilities. For example, FIG. 1b shows a user interface for a digital transmitter device 102-i. The user interface includes various sections of input devices to perform respective functions with the digital transmitter device. Section 102a allows input of alphanumeric strings with respective number keys in order perform input to send a facsimile and/or an e-mail. Section 102b shows a touch sensitive menu screen 102e for receiving input and/or outputting a display of diagnostics and/or status. Various menu buttons are also shown in Section 102b. Section 102c shows a copy start button to make a copy of one or more sheets of optically scanned paper. Section 102d shows a scan button to optically scan one or more pieces of paper. As an alternative to the user interface depicted in FIG. 1b, digital transmitter device 102-i can have a simpler front menu panel with a limited screen space and less input buttons or keys. As another alternative to the user interface depicted in FIG. 1b, digital transmitter device 102-i can have an integrated keyboard (such as a "QWERTY" keyboard) to assist in entering data.

A digital transmitter device 102-i is typically oriented toward performing one general task such as scanning and outputting that which was scanned. By contrast, devices such as desktop, laptop, and pocket PCs often provide multiple and varied means of input/output such as a full screen display, a keyboard, a mouse, speakers, microphones, PCMCIA (Personal Computer Memory Card International Association) slots, portable media drives and the like. These devices are capable of performing multiple functions through executing various software applications such as word processing applications, spreadsheet applications, financial applications, network browsers and network messaging applications.

Various digital transmitter devices 102-i are seen in FIG. 1a, including a facsimile machine 102-3, a multifunctional peripheral machine 102-2 with a printer device that can scan and print out a hardcopy or send an e-mail message with an attached copy of the scanned hardcopy, and a high volume copier 102-1 that includes the capabilities of printing on substrates of varied composition, binding, collating, folding, stacking, stapling, stitching, edge-trimming, and paginating.

Interconnecting network 104 is representative of one or more communication links, either wired or wireless, that are capable of carrying data between server(s) 106-i and other network resources in communication with interconnecting network 104. In certain exemplary implementations, interconnecting network 104 includes a local area network (LAN), a wide area network (WAN), an intranet, the Internet, or other similar network.

Local access to each digital transmitter device 102-i can be provided through an input device, such as a touch sensitive menu screen, on each digital transmitter device 102-i. A user accesses the input device via an access control process that is initiated by input that is made to a user interface. This input can be a handwritten signature upon a touch sensitive menu screen, a command sequence and/or User ID entered via a keyboard, as well as other means of input.

Following or prior to, the access control process, input to the user interface can be received in order to specify one or more e-mail addresses and an optional message text for an e-mail message that the user wishes to send. Alternatively, a default e-mail address or a list of selectable e-mail addresses can also be stored at each digital transmitter device 102-i. Each digital transmitter device 102-i has an imaging or scanning mechanism to receive images of an object (e.g., a hardcopy). A document composer component in each digital transmitter device 102-i then composes images of the scanned object, as discussed below. The detection of detectable indicia in the scanned hardcopy is followed by the insertion of various text and/or objects into respective insertion fields corresponding to the detectable indicia. After these insertions, a modified scanned image of the hardcopy is composed as a document. The composed document can then be output by digital transmitter device 102-i. The output can be made by the document being printed out, transmitted by a facsimile to a facsimile telephone number, or sent in a file attached to an e-mail message that is addressed to the input, default, or selected e-mail address(es) from digital transmitter device 102-i through interconnected network 104 to one or more e-mail servers 106-i for the respective e-mail address(es) input or specified by the user.

The user of digital transmitter device 102-i seen in FIG. 1a can transmit message data to interconnected network 104 by a wired or wireless link. A wireless link can be through an Infrared (IR) data connection or other wireless data connections such as the Blue Tooth or 802.11 protocol. The wireless link may be made through radio frequency (RF) or infra-red (IR) data ports. By way of example, digital transmitter device 102-i can include the capabilities of a cordless handset telephone, a cellular telephone, a personal digital assistant (PDA), a pager, a watch and the like, any of which is also capable of transmitting data in a wireless manner. A wired link can be performed through a USB data connection, a serial port connection, a parallel port connection or via other known data transmission standards and modes. The wired link may be implemented through standard category V cable, Universal Serial Bus (USB) cable, or IEEE 1394 (i.link/Lynx/Fire Wire™) connection data ports. As such, digital transmitter device 102-i can transmit by one or both of a wireless or wired link.

Figure 2:
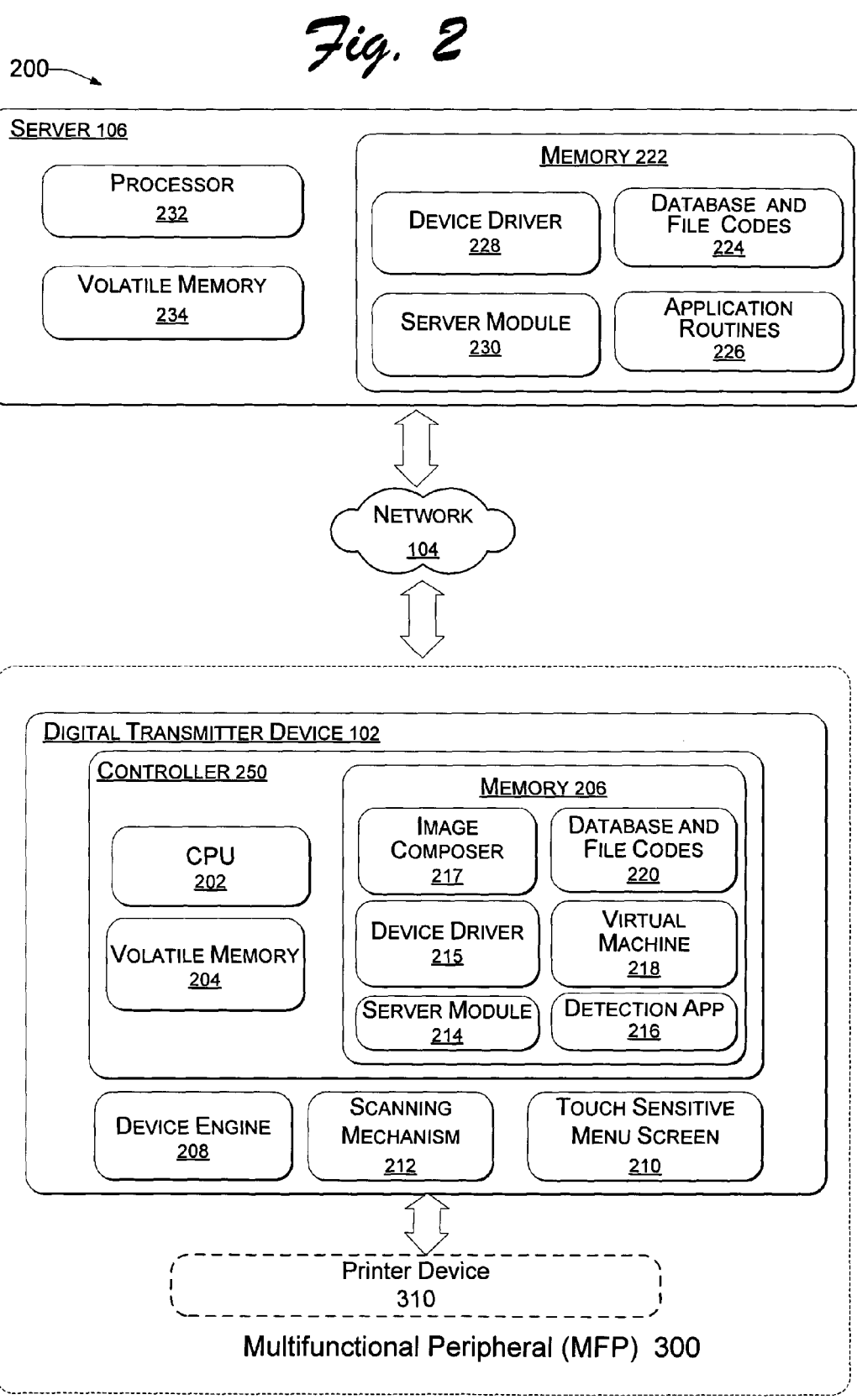
FIG. 2 is a block diagram, according to an embodiment of the present invention, illustrating a digital transmitter device in communication through a wired or wireless link to an interconnecting network to which a server is also in communication.

Exemplary System for a Digital Transmitting Device in Communication with a Server A system 200 of FIG. 2 includes digital transmitter device 102 as a network resource coupled by a wired or wireless link to interconnecting network 104 and to server 106 through interconnected network 104. As such, FIG. 2 illustrates an embodiment of the system 100 of FIG. 1a in greater detail. In accordance with still further aspects of the present invention, digital transmitter device 102 may be included within a multiple function peripheral (MFP) device 300. As its name implies, the MFP device 300 is configured to provide multiple functions. In this example, the functions provided by the MFP device 300 include those provided by digital transmitter device 102 as well as an optional printer device 310. Consequently, the user of digital transmitter device 102 may also print out a hardcopy of any applicable portions of data stored, scanned or otherwise acquired by digital transmitter device 102.

In general, digital transmitter device 102 uses a controller 250 to execute a program that can be stored in an image composer 217 of a memory 206. Execution of the image composer 217 will compose a document from images that are captured by scanning the document using a scanning mechanism 212. A detection application 216 in memory 206 can be used to detect detectable indicia in an optically scanned image, to determine the size, shape, and location of insertion fields from the detected indicia, and to determine a process for obtaining the text or objects to be inserted into each insertion field in the optically scanned image.

Input from a user, and/or the detected indicia, can be used as a key to look up corresponding text or objects in a database and file codes storage 220 in memory 206 of digital transmitter device 102 and/or in database and file codes storage 224 in memory 222 of server 106. Text or objects thus obtained can then be used for any of a variety of purposes. For instance, the input from the user can be a User ID, an access code, a character string, or a sequence of codes that can be looked upon the database and file codes storage 220 for the purpose of obtaining a single email address and/or an e-mail address list.

The detected indicia can be a bar code or invisible ink symbol that can be looked up in the database and file codes storage 220. This look up operation can obtain corresponding text and/or objects. These corresponding text and/or objects can then be substituted into the corresponding insertion fields in a scanned hardcopy so as to take the place of the detected indicia. Other look ups are also contemplated, such as particular patterns, where different patterns could indicate different types of insertions.

Upon obtaining the text and/or objects, the execution of the detection application 216 can also fit, insert, and/or superimpose each such text or object into, around, and/or proximal to the corresponding insertion field of the optically scanned image. The image composer 217 can be used to compose a modified optically scanned version of the document containing the inserted text and/or objects. This modified optically scanned version of the document can then be output or rendered. Alternatively, the modified optically scanned version of the document can be composed and stored, in full or in part, locally in and/or remotely to scanning mechanism 212.

Controller 250 can execute a program so as to transform data to a driver format suitable for printing with integral, optional printer device 310, such as a mark up language format (e.g. SMGL, HTML, or XML), or such as a job language format (e.g. PCL or POSTSCRIPT®). Printer device 310 can have the capability of converting data and then outputting it onto an appropriate print media, such as paper, transparencies or glossy photo paper.

Digital transmitter 102 includes one or more CPUs 202, each of which is operatively coupled to memory 206, and a user interface that includes an input device. Preferably, the input device will be locally accessible at digital transmitter device 102. By way of example, the input device can be a touch sensitive menu screen 210. Digital transmitter device 102 also includes at least one communication port for interfacing with interconnecting network 104 through either a wired or wireless link.

When included in MFP device 300, CPU(s) 202 would also be operatively coupled to printer device 310, for example. CPU(s) 202 is representative of any hardware, firmware and/or software that is configured to perform certain functions associated with the operation of digital transmitter device 102. Hence, as those skilled in the art will recognize, CPU(s) 202 may include dedicated logic and/or one or more processors configured in accord with software instructions, for example.

Memory 206 is representative of any type of data storage mechanism that can be accessed by at least CPU(s) 202. Memory 206 may therefore include, for example, some form of random access memory (RAM), some form of read only memory (ROM), and/or other like solid-state data storage mechanism. Memory 206 may include a magnetic and/or optical data storage mechanism. Scanning mechanism 212 is representative of any optical scanner technology that may be employed to produce scanned object data upon scanning an object. Such scanning technologies are well known. The resulting scanned object data is provided to CPU 202 and/or stored in memory 206.

Controller 250 of digital transmitter device 102 typically includes data processing unit or CPU 202, a volatile memory 204 (i.e., RAM), and a non-volatile memory 206 (e.g., ROM, Flash). Digital transmitter device 102 also includes a device engine 208. The touch sensitive menu screen 210 acts as a local user interface for digital transmitter device 102 by displaying menu pages and accepting user input based on selectable menu items displayed on the menu pages. The touch sensitive menu screen 210 can be used to display a menu page that asks for and receives the input, such as an e-mail address to which to image data that is scanned with scanning mechanism 212 is to be transmitted in an e-mail message via interconnected network 104.

Controller 250 processes data and manages device functions by controlling device engine 208 and by responding to input from touch sensitive menu screen 210. Device driver software in a device server can be stored in memory 206 and executed on CPU(s) 202. Memory 206 also includes a server module 214 configured to serve menu documents to the touch sensitive menu screen 210. The server module 214 is a local server in the sense that it is present within the same digital transmitter device 102 to which it serves menu documents.

As mention above, controller 250 can optionally include a User ID/Signature File and Code component that is stored in the database and file codes storage 220 in memory 206. This User ID/Signature File and Code component would in turn be used to validate a user identification code (User ID) and a corresponding digital representation of a signature for the purpose of ascertaining the access control rights of a user. Alternatively, server 106 can perform this function through a database and file codes storage 224 in memory 222 of server 106.

Menu documents stored in memory 206 can be interpreted by the server module 214 and are configured to display textual and graphical information as menu pages on the touch sensitive menu screen 210. The menu documents driving the menu pages can include script code that is associated with graphical keys. The term "script code" is intended herein to mean any one of a variety of different code types. Various kinds of code are contemplated. By way of example, and not by way of limitation, the code can be implemented in embedded script code, in firmware, in a native code such as C++ code, or can be JAVA script. The code can be written in JavaScript code that is interpreted and executed on a Java Virtual Machine (JVM). The code can also be written in other script code languages such as VBScript or Perl.

Selecting a menu item by pressing a graphical key on the touch sensitive menu screen 210 triggers an event, which causes a "virtual machine" 218 to interpret and execute the script code associated with the selected graphical key. The virtual machine 218 is a software module stored in memory 206 that executes on CPU(s) 202 to interpret and execute script code. The script code can be associated with selectable menu items (i.e., graphical keys or buttons). One menu item is configured to initiate a scan of an image using the scanning mechanism 212. Another menu item can be configured to perform the task of receiving input that includes a User ID, a priority code, and one or more e-mail address(es) to which e-mail message data is to be sent via interconnected network 104. Still another menu item can be configured to perform the task of initiating a retrieval of an e-mail address that was previously stored in memory 206, where memory 206 can optionally contain e-mail address information in the database and file codes storage 220 in memory 206 that can be requested to be displayed upon touch sensitive menu screen 210. When the e-mail address information is retrieved from memory 206, the user can select a displayed e-mail address to which an e-mail message will be transmitted over interconnected network 104 to one or more recipients via server 106-$i$ from the memory 206 of another digital transmitter device 102 as seen in FIG. 1$a$. Alternatively, the user can directly enter a specific e-mail address into the digital transmitter device 102 using touch sensitive menu screen 210. Controller 250 executes processes resident in a communicative link interface for a transmission (e.g. an e-mail message) that can be transmitted over a wired and/or wireless link to interconnected network 104. These transmitted email messages need not be sent to another digital transmission device 102-*i*, they may be sent to any device capable of receiving email.

The digital transmitter device can be configured such that the user can enter a command to initiate a scanning operation either before or after the user has obtained sufficient access rights, where the rights are based upon an access control check that is performed upon the user's manual input of data and/or a signature at touch sensitive menu screen 210. Prior to the scanning operation, the user places a document into a sheet feeder device associated with digital transmitter device 102. The sheet feeder device then physically feeds each sheet in the document to scanning mechanism 212. CPU(s) 202 process software or other machine executable code stored in image composer 217. Alternatively, the user can place a single sheet or substrate on to a glass platen associated with digital transmitter device 102. The image composer 217 then generates a bit map or other output that is a digital representation of the scanned document in a document composition process. The bit map or other digital representation of the document is examined for the presence of detectable indicia and insertion fields corresponding thereto by execution of the detection application 216 and/or other routines. Text and/or object(s) for each insertion field are obtained as described herein.

Once obtained, the text and/or objects are inserted into their respective insertion fields within the bit map or other output that is a digital representation of the scanned documents. A modified scanned image is then composed by image composer 217. The modified scanned image that is composed includes all insertion fields having the corresponding text and objects inserted therein by way of substitution for the detectable indicia.

The text and/or objects can be inserted in their respective insertion fields in a variety of ways. For instance, an insertion field can be rendered in the modified scanned image to appear as a water mark, so that the one or more superimpositions do not substantially obscure any portion of the images on the rendered documents. The superimpositions can appear to be integral with the images on the rendered document so that their appearance thereon is easily noticed and could not be easily removed. To further minimize obscuring any portion of the images on the rendered documents, the superimpositions can be situated in a margin or scaled so as to be small relative to the rendered document page size. To do so, the digital transmitter device can be configured, manually or otherwise, to have control over the location and size of the water mark on the rendered documents.

Once the document composition process has digitized the scanned object data with the insertion fields as discussed above, the composed documents can be printed out, sent as a facsimile transmission to a facsimile telephone number specified by the user, and/or sent in an attached file to an e-mail message that is transmitted to an e-mail address(es) specified by the user. Moreover, the image composer 217 of memory 206 can provide the digital transmitter device 102 with the capability of performing a variety of document composition routines for a plurality of data formats. These data formats include an American Standard Code for Information Interchange (ASCII) formatted data format, a word processor format, a spread sheet data format, a Portable Document Format (PDF) data format, a slide show software data format such as the Power Point® software data format from Microsoft Corporation of Redmond Wash., USA, a graphic image file format (GIFF) data format, a tagged image file format (TIFF) data format, a Joint Photographic Experts Group (JPEG) data format, a bit-map data format, an optical character recognition (OCR) data format, and/or other forms of encoded data, including, e.g., encrypted data, etc.

When the user enters a command displayed upon touch sensitive menu screen 210 to enter or retrieve an e-mail address, digital transmitter device 102 coordinates the input of the e-mail address. Controller 250 then executes a user message compositing routine which can be stored in memory 206. The user message compositing routine assembles message data. The message data so assembled can include the e-mail address(es) input or otherwise designated by the user, the bit map or other output that is a digital representation of the modified scanned image, and can also include any message text entered by the user upon touch sensitive menu screen 210. The message data is then sent by a wired and/or wireless link from digital transmitter device 102 to interconnected network 104. From interconnected network 104, a communication is established with an e-mail server 106 as seen in FIG. 1. The e-mail server 106 serves the e-mail address to which the e-mail message from digital transmitter device 102 is to be sent. By way of example server 106 can, but need not, function as the e-mail server of any e-mail address of digital transmitter devices 102-*i* seen in FIG. 1*a*. Alternatively, a server in communication with interconnected network 104, other than server 106, can be the e-mail server for e-mail addresses associated with digital transmitter devices 102-*i*.

CPU(s) 202 is configured to perform the operations described above using various executable modules of memory 206. These executable modules of memory 206 can include an e-mail address storage/retrieval routine, a communicative link interface routine, and a user message compositing routine, any of which can each be implemented in software and/or firmware.

In one embodiment of the invention, an e-mail address storage/retrieval routine executing on CPU(s) 202 receives input of an e-mail address from a user at touch sensitive menu screen 210 or retrieves a list of stored e-mail addresses by a look up that makes use of the user's input. The list of e-mail addresses can be displayed on touch sensitive menu screen 210 in a hierarchical list. The list can be sorted alpha-numerically. The user can either select from among the displayed e-mail addresses or input the characters of a specific e-mail address using a 'drill-down' function of the menu, as discussed below with respect to FIGS. 3-4. The drill-down menu format and the displayed list of retrieved e-mail addresses assist the user in locating an e-mail address of interest.

FIG. 2 shows server 106 as being in communication with interconnected network 104 and having a processor 232, a volatile memory 234, and memory 222. Memory 222 includes a device driver 228, a server module 230, optionally the database and file codes storage 224 discussed above, and application routines 226 for storage of software or other machine executable code. Application routines 226 are storage locations for programs that can be executed by processor 232 on server 106. One such routine is an access control routine that ascertains a user's privileges to use the digital transmitter device 102 based upon the input at touch menu screen 210 (e.g., User ID and/or manually input signature) as was discussed above.

Figure 3:
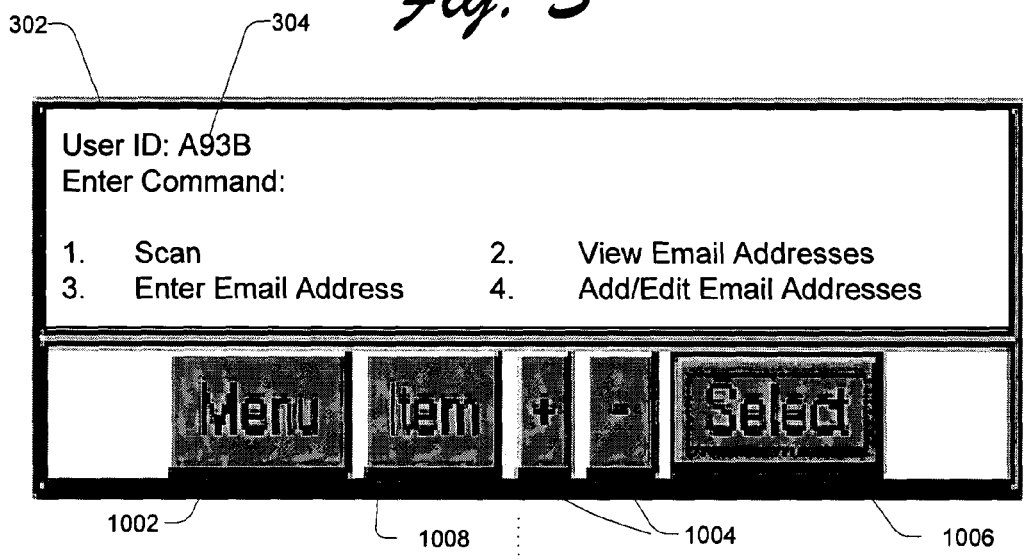
FIGS. 3-4 illustrate an example of sequential menu pages that might be displayed on a touch sensitive menu screen of a digital transmitter device, according to an embodiment of the present invention.
Figure 4:
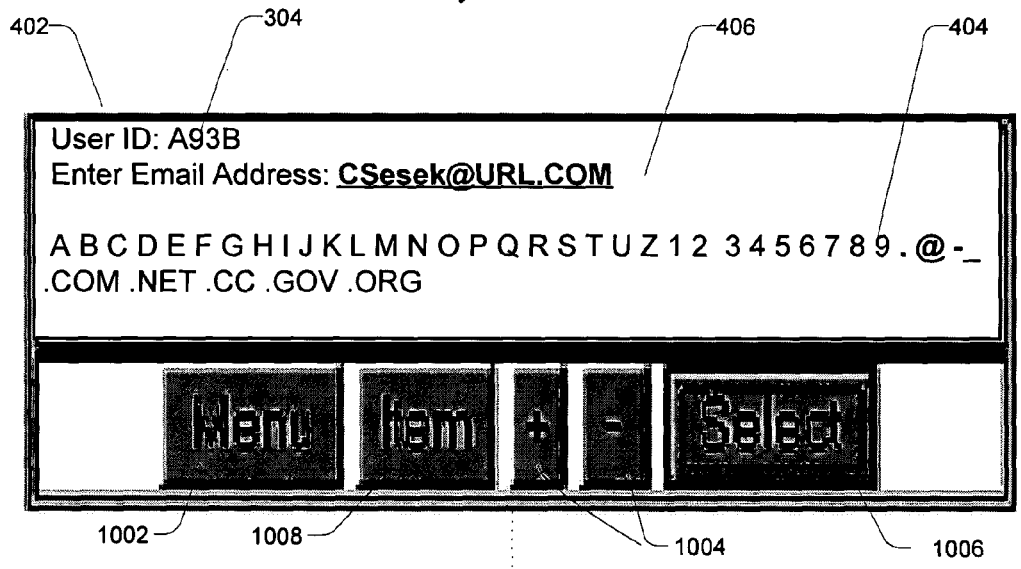
Figure 6:
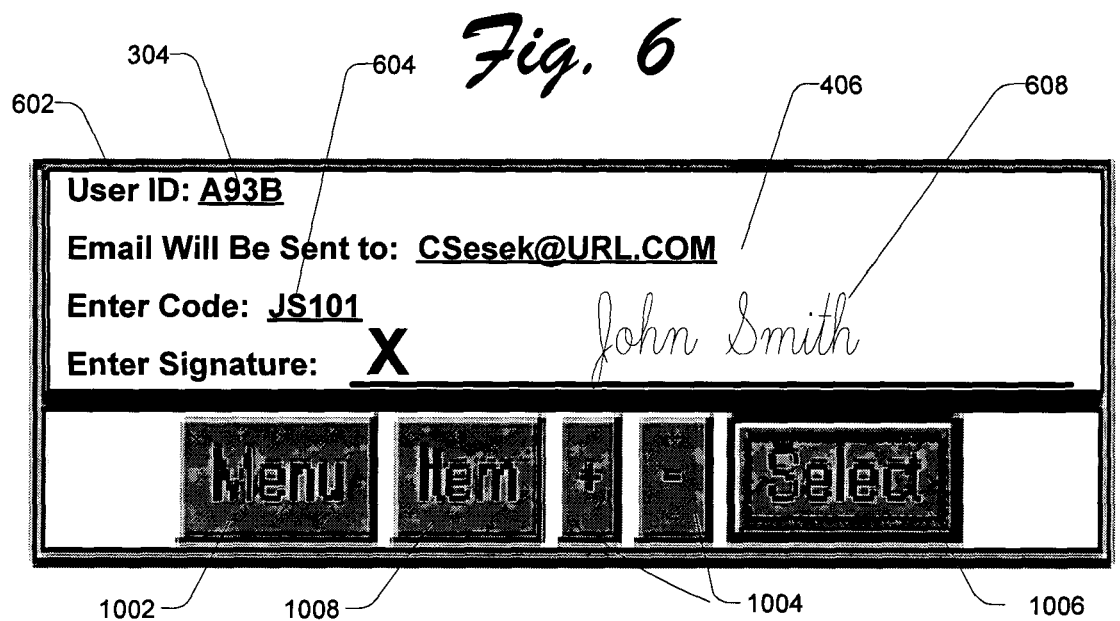
FIG. 6 illustrates an example, according to an embodiment of the present invention, of a menu page that might be displayed on the touch sensitive menu screen of the digital transmitter device in sequence after a transition from the menu page of FIG. 4, where input to one or more fields are provided by a user, where the one or more fields corresponds to the one or more fields on the paper document of FIG. 5.

As mentioned in the examples above, a user interface device can be used to accept the input of an e-mail address, insertions to be inserted into insertion fields, and a manually input signature from a user at the digital transmitter device. By way of example, a sequence of menus that can be displayed upon touch sensitive menu screen 210 of digital transmitter device 102 is seen in FIGS. 3, 4 and 6. A menu screen 302 seen in FIG. 3 is displayed upon touch sensitive menu screen 210 of digital transmitter device 102. Menu screen 302 shows various options to be selected by a user of digital transmitting device 102. In the example provided in FIG. 3, a user has already input the character string "A93B" at reference numeral 304 on menu screen 302. This character string 304 can be used for any of a variety of purposes. For instance, the character string 304 can be a User ID that is to be compared against an access control data base to determine if the User ID corresponds to particular use privileges with respect to the digital transmitter device 102. Alternatively, the character string 304 can be a form code that, by the input thereof, is used to identify a form template having one or more predetermined insertion fields. Once the predetermined insertion fields of the form template have been communicated to the digital transmitter device 102, text and/or objects can be scanned by scanning mechanism 212 for respective fitting into the one or more predetermined insertion fields.

When the user selects option "1" on menu screen 302, digital transmitter 102 activates scanning mechanism 212 to scan in documents as discussed above. When the user selected option "3" on menu screen 302, menu screen 402 seen in FIG. 4 is displayed. Menu screen 402 can be used to receive input from the user. The user can directly enter each character of a desired e-mail address using displayed virtual buttons. Menu screen 402 shows a practical example of a user selecting characters for a desired e-mail address. Script code executing in CPU(s) 202 can be used to present menu screen 402. The execution of this script code allows the user to see alphabetic and symbolic characters as the user depresses virtual buttons 1004 so as to move forward and backward through a displayed hierarchical list of available alphabetic and symbolic characters. Script code executes in CPU(s) 202 to enable a user to select a displayed character by depressing virtual button 1006. Output area 406 on menu screen 402 shows that the user has entered various letters and symbols for the e-mail address "CSTEVENS@URL.COM". Then, when the "Select" virtual button 1006 is depressed on touch sensitive menu screen 210, as represented by menu screen 402, the user sees a transition to a menu screen 602 in FIG. 6. Other virtual buttons on the touch sensitive menu screen 210 are also contemplated in order to provide for the initiation of other and/or additional functions by the user, such as a menu virtual item button 1002 seen in FIGS. 3, 4 and 6.

Figure 5:
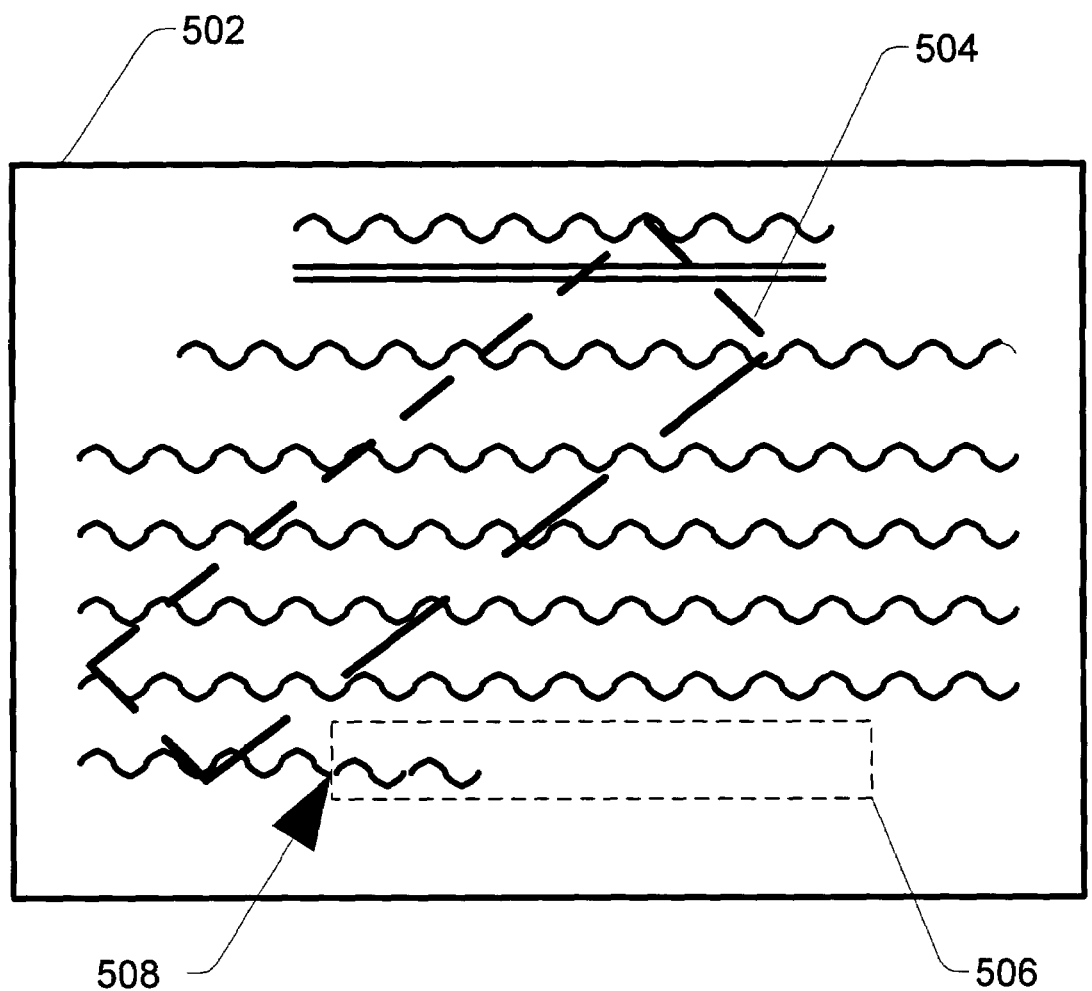
FIG. 5 illustrates an example, according to an embodiment of the present invention, of a paper document to be optically scanned into a scanning mechanism of a digital transmitter device, where the paper document has thereon one or more fields at predetermined positions and/or one or more fields of detectable indicia.

Before a user places one or more pieces of paper in a sheet feeder to be optically scanned with scanning mechanism 212 into digital transmitter device 102, one such piece of paper 502 can have an image such as is seen in FIG. 5. Of course, the image is not required to be on a piece of paper. Rather, the image can be on a substrate or other image-bearing surface. The image seen on paper 502 has a double underlined heading and has text below the heading. The text below the heading has a font, a case, a line spacing, a text color, a background color, a foreground color, a particular character spacing, certain text effects, an alignment for each line and each paragraph, text shadowing, and text shading. A first detectable indicia 504 and a second detectable indicia 506 are seen in the image on paper 502. As discussed above, such indicia can be any shape or symbol that is detectable by execution of a detection application 216 upon the optically scanned image by digital transmitter 102. As such, the first and second detectable indicia 504, 506 can be, for example, bar codes, invisible ink, visible ink, symbols, hole punch sequences, etc.

Reference numeral 508 points to a portion of the image on paper 502 where second detectable indicia 506 overlaps with text in the image on paper 502. The digital transmitter device 102 can be configured such that an insertion field corresponding to the second detectable indicia 506 will be shifted in the position thereof such that the text on paper 502 will not be obscured by the filling in of the insertion field corresponding to the second detectable indicia 506. As such, none of the text of paper 502 will be cropped or otherwise obscured by inserted text or objects. One routine for performing such a 'no cropping option' is to shift the location of the insertion field corresponding to the second detectable indicia 506 such that the complete periphery around the insertion field is represented only by a white color (e.g., a blank space). This completely white periphery can be detected by detection application 216 in the optically scanned image. Other known routines to avoid obscuring and/or cropping an underlying image with inserted text and objects are also contemplated.

The detection of first and second detectable indicia 504, 506 is interpreted by the execution of detection application 216 as an instruction to display the menu screen 602 seen in FIG. 6. Menu screen 602 displays a prompt for the user to manually enter an alphanumeric address code 604 and a handwritten signature 608. The alphanumeric address code 604 can be entered on touch sensitive menu screen 210 as was the e-mail address seen at 406 in menu screen 402 of in FIG. 4. A handwritten signature 608 can be entered by using a pen or stylus upon touch sensitive menu screen 210. Alternatively, the pen or stylus can also be used to make other inputs to menu screens 302 and 402 on touch sensitive menu screen 210. As can be seen in menu screen 602, the result of the manually entered signature is displayed. Alternatively, if digital transmitter device 102 and/or server 106 perform an access control routine for which the result is negative, menu screen 602 could display a diagnostic message or error code showing a denial of access.

After input is accepted from the user of menu screen 602, the input can be used to look up data and object to be inserted into the two insertion fields that correspond to the first and second detectable indicia 504, 506. The location, size, and shape, and any rule governing the same, can also be looked up for the two insertion fields. These data and objects can be found by look ups in one or both of database and file codes storage 220, 224, respectively, at digital transmitter device 102 and server 106.

Figure 7:
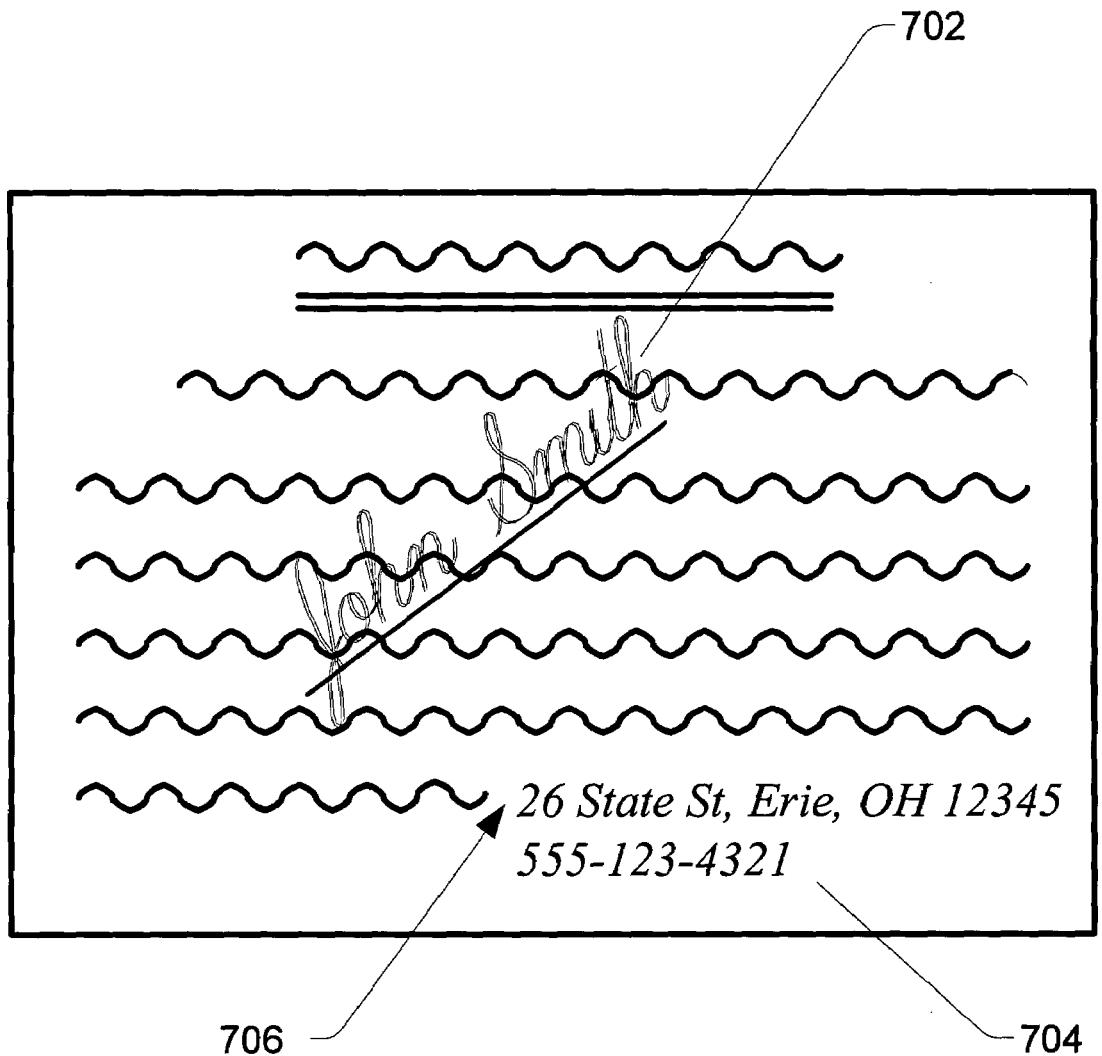
FIG. 7 is a representation of the paper document of FIG. 5 after it has been composed by the digital transmitter device, where one of the fields on the paper document of FIG. 5 has been substituted for a fitted field that includes a manually input signature that is superimposed as a watermark on the paper document, where the other field on the paper document of FIG. 5 has address and telephone number data fitted therein and situated so as to avoid clipping an adjacent marking on the paper document, and where the contents of these two (2) fields were directly or indirectly obtained from the user input as shown in FIG. 6, according to an embodiment of the present invention.

Once the text and/or objects are found by the look ups, they can be inserted, fitted into, or otherwise superimposed into/onto the size and shape of each of the two insertion fields by execution of the image composer 217 and/or the detection application 216. An example of a resultant modified scanned image is seen in FIG. 7. The modified scanned image shows a superimposed watermark handwritten signature 702 that has been substituted for the insertion field corresponding to first detectable indicia 504. The superimposed watermark handwritten signature 702 reflects the handwritten signature 608 that was input to menu screen 602. A look up was performed on the alphanumeric address code 604 entered in menu screen 602 to obtain the address data 704 that is seen inserted into an insertion field corresponding to the second detectable indicia 506. A 'no cropping' option has been used in the resultant modified scanned image in that the address data 704 is shifted to the right so as to avoid obscuring text in the image on the paper proximal to the reference numeral 706 in FIG. 7.

The modified scanned image seen in FIG. 7 can be printed out, sent to the displayed facsimile telephone number 555-123-4321 for rendering, and/or made into a document (e.g., a "*.PDF" file) that can be attached to an e-mail message addressed to the e-mail address "CSTEVENS@URL.COM." In transmitting an e-mail message after the foregoing input sequence from a user, digital transmitter device 102 can use the execution of image composer 217 to compose all insertion fields with the scanned document(s) and then assemble message data to be sent in an e-mail message through interconnecting network 104 to the e-mail address(es) that was/were selected or otherwise entered by the user, as discussed above.

Before a user places one or more pieces of paper in a sheet feeder to be optically scanned with a scanning mechanism into a digital transmitter device, one or more such pieces of paper can have an image, an example of which has been discussed above with respect to FIG. 5. After the document composition is performed by the digital transmitter device 102, each rendered page can have a representation such as has been discussed with respect to FIG. 7 where a manually entered signature has been superimposed with an address and facsimile number also inserted into the image.

Whether one or all of the rendered pages are to show the handwritten superimposed entries can be an option that is left to the user who is placing the detectable indicia. Alternatively, the routines controlling the corresponding insertion fields with respect to the placement and appearance of the insertions upon the rendered page can control whether or not one or all of the rendered pages are to show the handwritten superimposed entries. By way of example, if the document composition process produces a PDF file from scanned documents, a user that opens the PDF file with a PDF reader might see the handwriting superimposed on the rendering on all of the pages of the document in the PDF file. Other data can be superimposed by the document composition component of the digital transmitter device, such as the time, date, e-mail address of the sender, etc. Of course, data formats other than PDF, as discussed above, can be used by the image composer.

A form code can be input by a user at a touch sensitive menu screen 210 of digital transmitter device 102. The form code corresponds to a form template that is kept in storage. The storage can be local or remote to digital transmitter device 102. As such, the digital transmitter device 102 addresses in particular the situation in which the user wishes to produce a printed document based on a predetermined electronic form or template that includes material, textual or graphic, that has been (or will be) scanned and is then incorporated into the document. The completed document may be printed, faxed, transmitted electronically or stored electronically depending on the desires of the user and the capabilities of the digital transmitter device 102 used to create the completed document. In one implementation, the form template for the document being generated is preferably stored on a hard drive or other memory device of the digital transmitter device 102. The form template, however, may be stored on at server 106 or another network resource and downloaded to the digital transmitter device 102 via network 104.

With the form template that corresponds to a form code in memory, when scanned images are to be inserted into the template, the digital transmitter device 102 can access the form template from the memory and ascertain the size and/or position of one or more predefined insertion fields into which the scanned image(s) (and/or input from the user) can be fit. Alternatively, the size and other parameters of the one or more predefined insertion fields can be communicated to the digital transmitter device 102 from the server 106 on which a form template is resident. The digital transmitter device 102 can then automatically scan one or more images with scanning mechanism 212 at an appropriate resolution, scale and size to fit the one or more predefined insertion fields in the form template.

By way of further example, FIG. 5 can be deemed to represent an illustration of a form template 502. As shown in FIG. 5, the form template 502 includes standard elements that remain the same from use to use. These standard elements are exemplified in FIG. 5 by the non-descript areas outside of predefined insertion fields 504, 506. The predefined form template 502 may also be a dynamic form that includes data items that will be obtained and added each time the form is completed. For example, a dynamic form may include a date or time stamp. The dynamic form may also include a field for data that is pulled from an available data source, for example, the Internet and added to the form, such a price quote for a particular security, etc. Additionally, the exemplary form template 502 seen in FIG. 5 includes predefined insertion fields 504, 506 into which scanned images (graphical and/or textual) are to be inserted.

By way of example, a handwritten signature and address data can be on one or more pieces of paper that is scanned by scanning mechanism 212. A particular form code is input into digital transmitter device 102 that corresponds to form template 502 seen in FIG. 5. Alternatively, the user may be presented with a menu of the form templates existing on the system and prompted to select one of the form templates. This may all be done with user interface device 210 on digital transmitter device 102 or from the server 106. Once the form template is selected by the user, that form template will be retrieved from the memory 206 of the digital transmitter device 102. If the process is being controlled from the server 106, the form template may be downloaded to the digital transmitter device 102 via the connection to network 104. Alternatively, parameters of the one or more predefined insertion fields for which the one or more images are to be scanned may be communicated to the digital transmitter device 102 from the server 106. In either event, the digital transmitter device 102 will ascertain the number, size and position of one or more predefined insertion fields in the form template for which images are to be scanned. The user can then begin scanning the images of the handwritten signature and the address data that are to be included in the predefined insertion fields of the form template. Preferably, the digital transmitter device 102 prompts the user by displaying a request that the user scan one or more pieces of paper for each of the predefined insertion fields 504, 506 as they are defined in the form template 502. This request may be displayed on the user interface 210 on the digital transmitter device 102. Naturally, the user will be working directly with the digital transmitter device 102 to scan the desired images. However, the prompt(s) may be made with the connected server 106.

The user then scans the two (2) handwriting and address data images sequentially with the scanning mechanism 212 of the digital transmitter device 102. The digital transmitter device 102 or server 106 may prompt the user when it is ready to scan the next image, if more than one image is to be included in more than one predetermined insertion field in the form template 502.

As shown in FIG. 5, having ascertained the size, position and, perhaps, the shape of the predetermined insertion fields 504, 506 into which the scanned images will be placed, the digital transmitter device 102 will scan the two (2) handwriting and address data images and output, electronically, the images seen in FIG. 7 seen at 702, 704 that are the right size and shape for the predefined insertion fields 504, 506 and that have an appropriate resolution. Optionally, these images could be sized to fit the predefined insertion fields 504, 506 with or without distortion, i.e., the images could be scanned at an appropriate scale or scanned at a standard scale and the cropped to fit the intended predefined insertion fields.

The digital transmitter device 102 may then automatically insert the two handwriting and address data images that were scanned into the corresponding predetermined insertion fields 504, 506 in the form template 502. The result is a completed form seen in FIG. 7 with the scanned images incorporated into the appropriate fields 702, 704. The completed document seen in FIG. 7 can then be rendered by the digital transmitter device 102 for the user, transmitted as a facsimile, sent in an email attached document file (e.g., a *.PDF format) to an email message, or stored and/or transmitted as an electronic document file. In this way, predefined insertion fields can be fitted with incorporated scanned images quickly. Each scanned image in each predefined insertion field can be appropriately sized and, perhaps, shaped automatically. The user need not take time to edit, resize or crop a scanned image that is fitted into a predefined insertion field in a form template. If the scanned image (or its representation) that is provided has a shape that does not match the predefined insertion field, the digital transmitter device 102 will preferably size the scanned image to generally fit the predefined insertion field and then start at the center of the scanned image and crop, from the scanned image, an image of the appropriate shape to match the predefined insertion field.

Alternatively, the digital transmitter device 102 may rotate the image that is being scanned to better accommodate the size of the predefined insertion field. Other more sophisticated means of reshaping scanned images may also be employed as understood by those of ordinary skill in the art.

Figure 8:
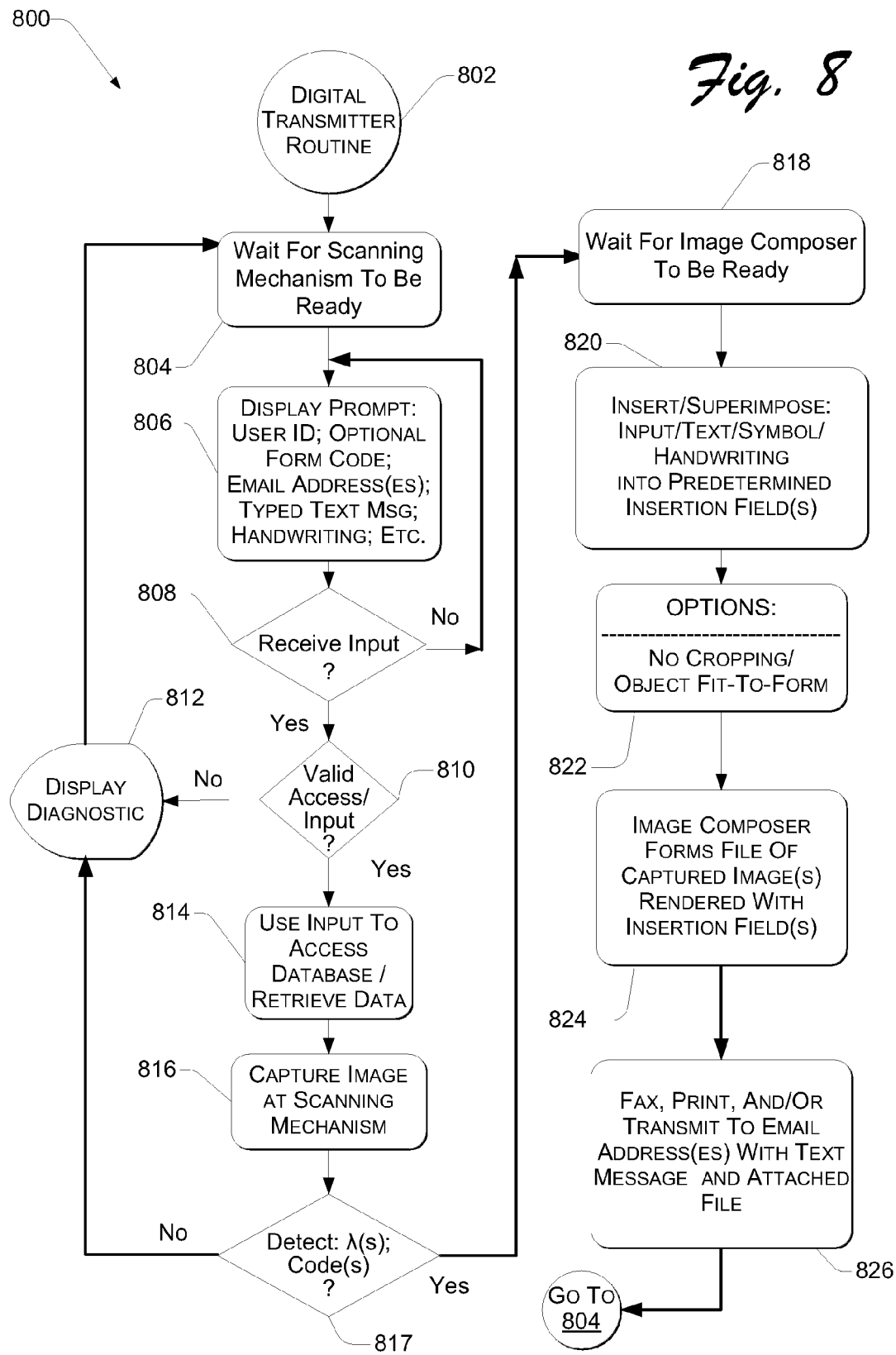
FIGS. 8-9 are flow diagrams depicting respective processes for use in a computing and communication environment having a digital transmitter device as in FIG. 1a, for example, in accordance with exemplary embodiments of the present invention.

Exemplary Embodiments of Digital Transmitter Device Capture of Substitutions for Predetermined Insertion Fields FIG. 8 shows a flow diagram, according to an embodiment of the present invention, depicting a method for using a digital transmitter device. With this in mind, CPU(s) 202 can be configured to perform the operations described below. By way of further example, the flow diagram is depicted in FIG. 8 to illustrate certain exemplary functions that can be performed using CPU(s) 202 and the other resources in digital transmitter device 102. Here, a process 800 is provided.

FIG. 8 shows process 800 beginning at step 802 which directs a process flow to step 804. At step 804, process 800 waits for the scanning mechanism 212 of the digital transmitter device 102 to be ready to perform a scanning operation. When the scanning mechanism 212 is ready, the process 800 moves control to step 806. At step 806, the digital transmitter device 102 displays a prompt upon touch sensitive menu screen 210. In order to display the prompt, the server module 214 of memory 206 in digital transmitter device 102 can serve a menu page that is stored in memory 206 to CPU 202 for execution of script code. The script code being executed by CPU 202 effects a function to be performed by digital transmitter device 102, such as receiving input from a user that is entered upon touch sensitive menu screen 210, or the initiation of a function by the user depressing a function related virtual button that is displayed upon touch sensitive menu screen 210. The script code will preferably be executed in conjunction with an interpretation of the menu page. Note that in certain implementations, the menu page can be directly interpreted by script code executing on CPU 202 without any prior storage in menu documents in memory 206 or use of server module 214 in digital transmitter device 102.

The prompt at step 806 directs a user to enter various inputs upon a user interface to the digital transmitter device 102. By way of example, such a user interface could be touch sensitive menu screen 210 of digital transmitter device 102 as seen in FIG. 2. The input can be entries that include a User ID and/or a manually entered signature. An entry can also be made for a form code, as discussed above. Other examples of input methods include biometric identification and employee badges.

After the entries of the user are accepted, the entries are queried at step 808. At step 808, it can be determined whether or not the user has made input to the user interface. If the user has not made input to the user interface then the process 800 passes control to back to step 806. If, however, the user has made input using the user interface at step 806, then the process moves to step 810. Alternatively, if the user has entered a form code, then the form code can be used to look up a form template. The form template can be retrieve and found to have one or more predetermined insertion fields therein. For instance, a user can enter a form code which, when looked up in a forms specification table, file or other logical structure, retrieves the form template and identifies specific locations therein that correspond to one or more predetermined insertion fields. By way of non-limiting example, this lookup can find that predetermined insertion fields 504 and 506 in a form template that has the appearance at reference numeral 502. Further on in process 800, text and/or objects can be scanned and/or input for insertion into the predetermined insertion fields 504 and 506.

At step 810, an access control check is preformed upon the input made at step 806. By way of example, the User ID 304 and the manually entered signature 608 seen in FIG. 6 can be queried against the database and file code storage 220 and/or 224 of either digital transmitter device 102 or server 106. This query can be used, for example, as access control check that determines whether or not the input User ID matches the manually entered signature. This matching routine can be performed using known handwriting recognition techniques, such as those incorporating a comparison of the speed at which a signature is executed. Other access control routines can also be used. Such as the previously mentioned use of biometric identification. If the access control check results in a denial of access (e.g., other than a positive result from the access control check), then a diagnostic message or error code is displayed to the user on the user interface at step 812 and the process 800 returns control to step 804. Other alternatives for a denial of access are contemplated. The digital transmitted device 102 can be disabled as to further access, and/or an alert message can be transmitted from the digital transmitter device 102 with or without a rendering of the manually input signature being attached to the message. If access is permitted, then process 800 proceeds to step 814.

When various acceptable inputs are made by the user, step 814 uses the input to access one or more databases so as to retrieve corresponding data. These data can be the size, shape and characteristics of insertion fields corresponding to detectable indicia. Other data that can be retrieved is one or more e-mail addresses in a distribution list and/or an optional text message to be sent with an e-mail message. By way of example and not by way of limitation, database and file codes storage 220, 224, respectively at the digital transmitter device 102 and at the server 106, can be used to retrieve these data.

Process 800 then passes control to step 816 where the scanning mechanism scans in the document for storage at the digital transmitter device. At step 817, the execution of detection application 216 locates detectable indicia in the optically scanned image of the document as discussed above. When an insufficient detection results, process 800 displays corresponding diagnostics at step 812 and return is made to step 804. Alternatively, step 817 can be skipped where the user previously entered a form code that is used at step 808 to retrieve a form template and its corresponding predetermined insertion fields. As discussed above, the predetermined insertion fields can be determined by use of input of a form code that corresponds to a form template that has the predetermined insertion fields, or by the detection of detectable indicia in an optically scanned page that corresponds to the predetermined insertion fields. Once the predetermined insertion fields are known, text and/or objects (or representations thereof) are inserted into predetermined insertion fields by scanning and fitting the same and/or by input received from the user.

After step 817 is acceptable, process 800 passes control to step 818 where process 800 waits for image composer component 217 and/or CPU(s) 202 of the digital transmitter device 102 to be ready to compose the scanned document. Image composer component 217 of digital transmitter device 102 can be used, in conjunction with scanning mechanism 212, to maintain data and/or algorithms, software, firmware, or other process control means for composing documents with the corresponding insertion fields in the optically scanned documents.

After step 818, the digital transmitter device 102 is prepared to compose the scanned document. Process 800 then proceeds to step 820. At step 820, the execution of image composer component 217 and/or detection application 216 of the digital transmitter device 102 inserts and/or superimposes text, symbols, and/or handwriting into the predetermined insertion fields that were determined as described above by the execution of detection application 216.

The completion of the insertion fields is made by a step 822 that permits various options. Once such option permits the digital transmitter device 102 to be configured so as to permit or prevent one or more specific insertion fields from cropping the underlying portion of the optically scanned document, as disclosed above (e.g., the 'no cropping' option). As a further option, the size and/or shape of the retrieved text and/or objects and their corresponding insertion fields can be adjusted to fit one another within the given size and shape of the optically scanned document.

After optional step 822, process 800 performs step 824 through the execution of the image composer 217 by digital transmitter device 102. The execution of the image composer 217 composes the document with the input (or retrieved) text and/or objects substituted into the one or more insertion fields, thereby producing a digital rendering of the document that was scanned at step 816. At step 826, the digital rendering can be output by printing, facsimile transmission, or by one or more e-mail messages that are assembled and transmitted to the e-mail address(es) input or otherwise specified by the user at step 806. Attached to each e-mail message is a file containing a digital rendering of the document. Alternatively, the user may be permitted an option at step 826 to preview the document with insertions prior to the output thereof. As a still further alternative, an embedded digital certificate of authenticity (e.g., a check sum) can be included in a transmission of the digital rendering. The recipient of the transmission (e.g., a facsimile machine, an email recipient, a web site, etc.) can provide verification, using the embedded digital certificate of authenticity, that then sender was indeed authenticated. After the step 826, process 800 returns to step 804 to repeat the foregoing procedure.

Figure 9:
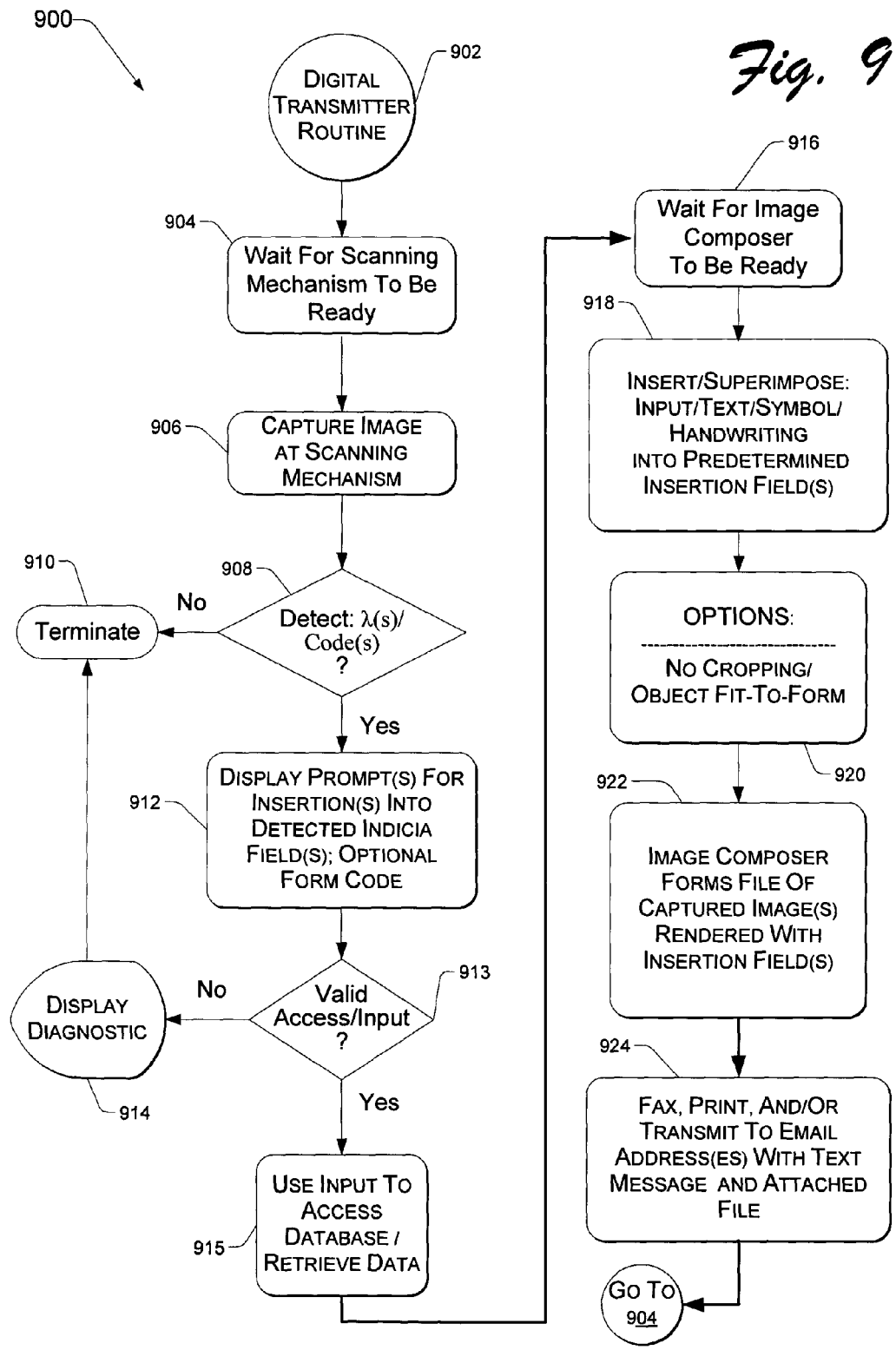

FIG. 9 shows a flow diagram, according to another embodiment of the present invention, depicting a method for using a digital transmitter device. With this in mind, CPU(s) 202 can be configured to perform the operations described below. By way of further example, the flow diagram depicted in FIG. 9 illustrates certain exemplary functions that can be performed using CPU(s) 202 and the other resources in digital transmitter device 102. Here, a process 900 is provided. Steps in process 900 have functional similarities to the steps in process 800 which has been discussed above.

FIG. 9 shows process 900 beginning at step 902 which directs a process flow to step 904. At step 904, process 900 waits for the scanning mechanism 212 of the digital transmitter device 102 to be ready. If so, the process 900 moves control to step 906 where the scanning mechanism 212 scans in the document for storage at the digital transmitter device. Step 908 calls for the execution of detection application 216 to locate detectable indicia in the optically scanned image of the document as discussed above. When an insufficient detection results, process 900 displays corresponding diagnostics at step 910 and then terminates. Alternatively, the detection application 216 can be configured to terminate after a diagnostic display when it has been determined that an expected form code has not been entered. The form code, however, could be entered at step 912 and then processed similarly to what has been discussed above with respect step 812 of FIG. 8, thereby identifying both a form template and its corresponding one or more predetermined insertion fields.

When the location of the one or more predetermined insertion fields have been determined as described above, the digital transmitter device 102 displays prompts upon touch sensitive menu screen 210. There can be one or more prompts corresponding to each of the one or more predetermined insertion fields. As discussed above, each predetermined insertion field is to have text and/or object(s) inserted therein, where the text and/or object(s) (or representations thereof) will be input by the user such as by a scanning operation with scanning mechanism 212, by a keyboard, or by other input device associated with digital transmitter device 102.

Input from a user is received and tested for validity at step 913. The validity test extends both to access control as well as compliance with expected input to corresponding insertion fields. The test that controls access to the digital transmitter device corresponds to that which was discussed above with respect to step 810 of FIG. 8. A test for a valid insertion to be made into the predetermined insertion fields can be based upon predetermined criteria for monitoring user input. An invalid access attempt (negative access control check) or an invalid input for insertion will result in a diagnostic that is displayed at step 914 followed by a termination of process 900 at step 910. When valid input is received from the user and the user is granted access control rights, process 900 moves to step 915.

When various acceptable inputs are made by the user, step 915 uses the input to access one or more databases so as to retrieve corresponding data. These data can be the size, shape and characteristics of insertion fields corresponding to detectable indicia. Other data that can be retrieved is one or more e-mail addresses in a distribution list and/or an optional text message to be sent with an e-mail message. By way of example and not by way of limitation, database and file codes storage 220, 224, respectively at the digital transmitter device 102 and at the server 106, can be used to retrieve these data.

Process 900 then passes control to step 916 where the process 900 waits until the image composer 217 of digital transmitter device 102 is ready to compose a modified scanned image of the document. Once the image composer 217 is ready, process 900 moves to step 918. At step 918, the image composer component 217 of digital transmitter device 102 can be executed, in conjunction with scanning mechanism 212, to maintain data and/or algorithms, software, firmware, or other process control means for composing documents with the corresponding insertion fields in the optically scanned documents. The digital transmitter device 102 executes image composer component 217 and/or detection application 216. This execution inserts and/or superimposes text, symbols, objects, and/or handwriting into the predetermined insertion fields that were determined to be in the document. In an optional routine at step 920, the digital transmitter device 102 can be configured to permit or prevent one or more specific insertion fields from cropping the underlying portion of the optically scanned document, as disclosed above (e.g., the 'no cropping' option). As a further option at step 920, the size and/or shape of the retrieved text and/or objects and their corresponding insertion fields can be adjusted to fit one another within the given size and shape of the optically scanned document.

After step 920, process 900 performs step 922 through the execution of the image composer 217 by digital transmitter device 102 that composes the document with the insertion fields filled in, thereby producing a rendering of the document. At step 922, the process 900 moves to step 924 where the rendering can be output by printing, facsimile transmission, or by one or more e-mail messages that are assembled and transmitted to one or more e-mail addresses. A file containing the rendering of the document can be attached to each e-mail message that is to be transmitted. The rendering can be output to devices that are referenced by a Universal Resource Locator (URL), a telephone number, and by any other known means for addressing output. Alternatively, the user may be permitted the option at step 924 to preview the document with insertions prior to the output thereof. After the step 924, process 900 returns to step 904 to repeat the foregoing procedure.

It is contemplated that processes 800 and 900, and other portions of the disclosure herein, can be modified to enhance assurances as to the authenticity of a signature. Several examples of authentication techniques follow. Once such authentication technique for a signature can be an optical character recognition routine (OCR) that is performed upon the signature that is input by a user at an input device of the digital transmitter device. The result of the OCR can be compared against a database of stored signatures to which access rights are accorded.

Another authentication technique can be applied to input that is not a user's signature. Rather, the user can input a password, a personal identification number (PIN), a biometric identification (finger print, retinal scan, etc.) using an input device configured for receiving the same, and/or a combination thereof. Then, the user could insert, by making an input, a previously entered and stored auto-signature, specific logo, or other restricted or otherwise controlled access graphic, text or object. One of more of these could then be used as the basis of an access control check.

For email and facsimile transmissions to be sent from the digital transmitter device, the digital signature can be authenticated by a routine executing at the digital transmitter device (or by a connected authentication service). This authentication can be by use of a handwriting and/or signature analysis algorithm. This authentication can be used for any of several purposes, including allowing the transmission to be sent as a job from the specific user (i.e., an unrecognized or otherwise invalid signature would be deemed to lack sufficient access rights to send the transmission) as well as using the authentication as a form of a digital certification that would verify the user's identity—similar to a digital badge.

Another exemplary authentication technique is to capture each transmitted signature for storage in a database. The database provides an audit trail for later research by network security personnel, if desired. Additionally, an originally stored reference signature, such as that corresponding to a particular User ID, can be stored in a database for comparison to the transmitted signature in yet another form of audit trail that can be used for later research by network security personnel, if desired. The transmitted signature can be automatically compared to the reference signature, or other characteristics thereof (e.g. the speed at which all or a portion of the signature was signed), to arrive at a statistical assessment of the differences and similarities there between. One or more predetermined thresholds of these differences and similarities can be set and above which an alert can be transmitted to network security personnel for further evaluation as to authenticity. These predetermined thresholds serve as a degree of match validation that can be quantified when transmitted or otherwise made available to network security personnel. With respect to signed documents that relate to financial transactions and/or confidential or sensitive communications, relatively low thresholds might be set, as compared to common documents, to ensure a substantial degree of match validation. Signature validation techniques can be implemented such that the predetermined thresholds can be set, adjusted, or removed, as desired upon demand of network security personnel. Other factors could be preconfigured into signature validation techniques to contribute to a calculus for arriving at values for the respective predetermined thresholds, such as the electronic address to which a signed document is to be transmitted (e.g. inside vs. outside of a local intranet) by the digital transmitter device.

The foregoing Detailed Description has set forth an example of transmitting an e-mail message from a digital transmitter device. Embodiments of the present invention contemplate other types of data that can also be addressed and transmitted from a digital transmitter device to an electronic address, including those now known and those yet to be developed. As such, and in addition to an e-mail transmission, embodiments of the present invention include a transmission from a digital transmitter device to an electronic address that includes an address of a network resource on a network and a destination location thereat. By way of example, and not by way of limitation, the electronic address can be a file folder address at a server on a network and can also be a Web site address at a server on a network.

Although some implementations of the present invention have been illustrated in the accompanying Drawings and described in the foregoing Detailed Description, it will be understood that the present invention is not limited to the exemplary implementations disclosed, but is capable of numerous rearrangements, modifications and substitutions without departing from the spirit of the invention as set forth and defined by the following claims.

What is claimed is:

1. A computer-readable medium having stored thereon computer-executable instructions which, when executed on one or more processors of a digital transmitter device, direct the digital transmitter device to perform a method comprising:

composing a digital image from an optically scanned image at the digital transmitter device;

detecting predetermined indicia in the digital image, wherein the detecting further comprises locating a portion of the digital image corresponding to the predetermined indicia, wherein the portion includes a bar code;

receiving a handwriting image, comprising a manually entered signature, at a touch sensitive input device of the digital transmitter device corresponding to the detected predetermined indicia in the digital image;

forming the received handwriting image into the digital image as a substitute for the detected predetermined indicia in the digital image;

performing a validation routine of the handwriting image against an access control database; and when the result of the validation routine is positive, outputting a rendering of the digital image.

2. The computer-readable medium as defined in claim 1, wherein the composing further comprises transforming optically scanned images of one of more sheets of paper into the digital image, wherein one of more sheets of paper were received from a sheet feeder at a scanning mechanism of the digital transmitter device.

3. The computer-readable medium as defined in claim 1, wherein the detecting further comprises locating a portion of the digital image corresponding to the predetermined indicia, wherein the portion exhibits a predetermined range of reflectance values.

4. The computer-readable medium as defined in claim 3, wherein the predetermined range of reflectance values is detectable at the portion when the portion is illuminated by tight having a predetermined range of wavelengths.

5. The computer-readable medium as defined in claim 1, wherein the rendering of the digital image is selected from the group consisting of a print out, a facsimile transmission of the digital image, an e-mail message containing a representation of the digital file, and an e-mail message having a file attached thereto that contains a representation of the digital file.

6. The computer-readable medium as defined in claim 1, wherein the bar code has a value corresponding to the object to be substituted.

7. The computer-readable medium as defined in claim 1, wherein:

the detecting predetermined indicia in the digital image further comprises detecting a symbol corresponding to the predetermined indicia in the digital image; and the symbol represents the object to be substituted.

8. The computer-readable medium as defined in claim 1, wherein the substituting further comprises:

determining a value for the detected predetermined indicia; and looking up the determined value in a table of values having objects respectively corresponding thereto in order to determine the object to be substituted.

9. The computer-readable medium as defined in claim 1, wherein:

the predetermined indicia are detected in the digital image at a portion thereof having a perimeter;

the object to be substituted has a predetermined size and shape; and the substituting further comprises:

changing the predetermined size and shape of the object to be substituted into a size and shape not larger than the perimeter of the portion of the detected predetermined indicia; and substituting the changed predetermined size and shape of the object for the detected predetermined indicia in the digital image.

10. The computer-readable medium as defined in claim 1, wherein:

the predetermined indicia is detected in the digital image at an indicia portion thereof; and the substituting further comprises:

determining whether the indicia portion intersects any non-blank region of the digital image; and situating the object in the digital image such that the object does not intersect a non-blank region of the digital image.

11. The computer-readable medium as defined in claim 1, wherein:

the substituting further comprises receiving input of an electronic address; and the outputting a rendering of the digital image further comprises forming a transmission for transmitting a network message including the digital image from the digital transmitter device to the electronic address including an address of a network resource and a destination location thereat.

12. A computer-readable medium on which are stored computer readable instructions, comprising instructions for causing a digital transmitter device to scan an image for inclusion in a document, wherein said document includes on a form template that incorporates said scanned image in a predefined insertion field, the form template or parameters of said form template being stored in or accessible to said digital transmitter device, wherein:

said computer readable instructions cause:

an optical scanner of said digital transmitter device to scan said image for inclusion in said form template in accordance with a size or position of said predefined insertion field; and a validation of the scanned image, or representation thereof, against an access control data base such that, upon such validation, the instructions further cause said scanning device to incorporate said scanned image into the predefined is insertion field of the form template.

13. The computer-readable medium as defined in claim 12, wherein:

said instructions further cause the digital transmitter device to output a rendering of the scanned image incorporated into the form template; and the rendering of the digital image is selected from the group consisting of a print out, a facsimile transmission of the digital image, an e-mail message containing a representation of the digital file, and an e-mail message having a file attached thereto that contains a representation of the digital file.

14. The computer-readable medium as defined in claim 12, wherein said instructions further cause the digital transmitter device to:

receive input of an electronic address that includes an address of a network resource and a destination location thereat;

output a rendering of the scanned image incorporated into the form template; and form a transmission for transmitting a network message including the rendering from the digital transmitter device to the electronic address.

15. A digital transmitter device comprising:

means for making input;

means for composing a digital image from an optically scanned image;

means for detecting predetermined indicia in the digital image;

means for substituting an object for the detected predetermined indicia in the digital image;

means for storing an access control database;

means for validating manual input received at the means for making input against the access control database;

means, when the means for validating validates the manual input, for making the object to be the manual input;

means, when the means for validating does not validate the manual input, for making the object to be a diagnostic reflecting the absence of validation of the manual input; and means for outputting a rendering of the digital image.

16. The digital transmitter device as defined in claim 15, wherein the means for making the object to be the manual input further comprises means for forming a transmission message to be transmitted over an interconnected network to an electronic mail address.

17. The digital transmitter device as defined in claim 15, wherein the means for detecting further comprises means for locating a portion of the digital image corresponding to the predetermined indicia, wherein the portion exhibits a predetermined range of reflectance values.

18. The digital transmitter device as defined in claim 17, wherein the predetermined range of reflectance values is detectable at the portion when the portion is illuminated by light having a predetermined range of wavelengths.

19. The digital transmitter device as defined in claim 15, wherein the means for detecting further comprises locating a portion of the digital image corresponding to the predetermined indicia, wherein the portion includes a bar code.

20. The digital transmitter device as defined in claim 19, wherein the bar code has a value corresponding to the object to be substituted.

21. A digital transmitter device comprising:
    means for composing a digital image from an optically scanned image;
    means for detecting predetermined indicia in the digital image;
    means for receiving handwriting image, comprising a manually entered signature, at a touch sensitive input device of the digital transmitter device;
    means for performing a validation routine of the handwriting image against an access control database; and
    means, when a result of the validation routine is positive, for:
    forming the handwriting image, or representation thereof as a substitute for the detected predetermined indicia in the digital image; and
    outputting a rendering of the digital image.

22. The digital transmitter device as defined in claim 21, wherein the means for outputting further comprises means for forming a network message to be transmitted, wherein the network message includes the digital image and is addressed to an electronic address including an address of a network resource and a destination location thereat.

23. The digital transmitter device as defined in claim 21, wherein the means for detecting further comprises means for locating a portion of the digital image corresponding to the predetermined indicia, wherein the portion exhibits a predetermined range of reflectance values.

24. The digital transmitter device as defined in claim 23, wherein the predetermined range of reflectance values is detectable at the portion when the portion is illuminated by light having a predetermined range of wavelengths.

25. The digital transmitter device as defined in claim 21, wherein the means for detecting further comprises locating a portion of the digital image corresponding to the predetermined indicia, wherein the portion includes a barcode.

26. The digital transmitter device as defined in claim 25, wherein the bar code has a value corresponding to the object to be substituted.

27. A digital transmitter device for producing documents based on a form template that incorporates a scanned image, the digital transmitter device comprising:
    a processor;
    an optical scanner controlled by said processor; and
    a memory unit including an access control database and an access control program, wherein:
    the memory unit is accessible to said processor in which said form template or parameters of said form template are stored, said form template including a predefined insertion field for accepting the scanned image, wherein said processor controls said scanner to scan an image for inclusion in said form template, said processor controlling said scanner to automatically scan said image in accordance with a size or position of the predefined insertion field; and
    the processor executes the access control program to validate the scanned image, or representation thereof, against the access control database such that when the validation for the scanned image is:
    negative, output a diagnostic reflecting the absence of validation; and
    positive, output a rendering of the digital image that includes the scanned image inserted into the predefined insertion field.

28. The digital transmitter device as defined in claim 27, wherein the processor executes a program to form a network message to be transmitted to an electronic address that includes an address of a network resource and a destination location thereat, and wherein the network message includes the rendering of the digital image that includes the scanned image inserted into the predefined insertion field.

29. A digital transmitter device for producing documents that incorporate scanned images based on a form template, the digital transmitter device comprising:
    an optical scanning means;
    memory means in which said form template or parameters of said form template are stored, said form template including a predefined insertion field for accepting a scanned image;
    means for controlling said scanning means to scan an image for inclusion in said form template, said means for controlling said scanning means causing said scanning means to automatically scan said image in accordance with a size of said predefined insertion field;
    means for storing an access control database;
    means for validating the scanned image, or representation thereof, against the access control database;
    means, when the means for validating validates, for outputting a rendering of the form template with the scanned image included therein; and
    means, when the means for validating does not validate, for outputting a diagnostic.

30. The digital transmitter device as defined in claim 29, wherein the rendering is selected from the group consisting of a print out, a facsimile transmission of the digital image, an e-mail message containing a representation of the digital file, and an e-mail message having a file attached thereto that contains a representation of the digital file.

31. The digital transmitter device as defined in claim 29, further comprising:
    means for receiving input of an electronic address that includes an address of a network resource and a destination location thereat; and
    means for forming a transmission for transmitting a network message including the rendering from the digital transmitter device to the electronic address.

32. A method comprising:
    forming an optically scanned image at a digital transmitter device of media bearing predetermined indicia;
    composing, at the digital transmitter device, a digital image from the optically scanned image;

detecting, with the digital transmitter device, a portion of the optically scanned image at which the predetermined indicia is situated;

identifying, with the digital transmitter device, an object corresponding to the predetermined indicia;

performing a validation routine of the object against an access control database; and when the validation routine returns a positive access result:

substituting the object, or representation thereof, into the digital image at the portion of the optically scanned image at which the predetermined indicia is situated; and outputting, at the digital transmitter device, a rendering of the digital image.

33. The method as defined in claim 32, wherein the rendering is selected from the group consisting of a print out, a facsimile transmission, and an e-mail message.

34. The method as defined in claim 32, wherein the outputting further comprises forming a network message that includes the rendering and that is addressed to an electronic address including an address of a network resource and a destination location thereat.

35. The method as defined in claim 32, wherein the portion exhibits a predetermined range of reflectance values.

36. The method as defined in claim 35, wherein the predetermined range of reflectance values is detectable at the portion when the portion is illuminated by light having a predetermined range of wavelengths.

37. The method as defined in claim 32, wherein the portion includes a bar code.

38. The method as defined in claim 37, wherein the bar code has a value corresponding to the object to be substituted.

39. A method performed by a digital transmitter device, the method comprising:

optically scanning an image;

substituting into a digital image at least one of:

input received at the digital transmitter device, wherein:

the digital image is formed by the optically scanning;

the input is substituted for predetermined indicia in the digital image; and the predetermined indicia is detectable by the digital transmitter device in the digital image; and the optically scanned image, wherein the optically scanned image is substituted for a predefined insertion field in the digital image;

validating what is substituted for predetermined indicia in the digital image against an access control database such that when the validation for the scanned image is:

negative, the method further comprising outputting a diagnostic reflecting the absence of validation; and positive, the method further comprises rendering the digital image having the substitution.

40. A method of producing a document with a digital transmitter device, wherein the document is based on a form template that incorporates a scanned image into a predefined insertion field, the form template, or parameters of said form template being stored in or accessible to said digital transmitter device, the method comprising:

scanning an image for inclusion in said form template, said scanning being automatically performed in accordance with a size or position of said predefined insertion field;

validating the scanned image, or representation thereon against an access control database such that when the validation for the scanned image is:

negative, the method further comprising outputting a diagnostic reflecting the absence of validation of the scanned image; and positive, the method further comprises incorporating said scanned image into said form template at the predefined insertion field and outputting a rendering of the form template.

41. The method as defined in claim 40, further comprising automatically shaping said scanned image in accordance with a shape of said predefined insertion field.

42. The method as defined in claim 40, further comprising adding a dynamic data item to said form template.

43. The method as defined in claim 40, further comprising repositioning, reformatting, reshaping or resizing elements of said form template in accordance with a predetermined position of said scanned image and a size of said scanned image.

* * * * *

UNITED STATES PATENT AND TRADEMARK OFFICE
CERTIFICATE OF CORRECTION

PATENT NO. : 7,542,160 B2  Page 1 of 1
APPLICATION NO. : 10/652061
DATED : June 2, 2009
INVENTOR(S) : Travis J. Parry et al.

It is certified that error appears in the above-identified patent and that said Letters Patent is hereby corrected as shown below:

In column 25, line 18, in Claim 4, delete "tight" and insert -- light --, therefor.

In column 26, line 26, in Claim 12, after "predefined" delete "is".

In column 27, line 34, in Claim 21, delete "thereof" and insert -- thereof, --, therefor.

In column 27, line 50, in Claim 24, after "claim 23," delete "a".

In column 27, line 57, in Claim 25, delete "barcode" and insert -- bar code --, therefor.

In column 30, line 22, in Claim 40, delete "thereon" and insert -- thereof, --, therefor.

Signed and Sealed this

Thirty-first Day of August, 2010

David J. Kappos
*Director of the United States Patent and Trademark Office*